US007458732B2

(12) United States Patent
Harano et al.

(10) Patent No.: US 7,458,732 B2
(45) Date of Patent: Dec. 2, 2008

(54) OPTICAL AND ELECTRICAL COMPOUND CONNECTOR

(75) Inventors: Tomokazu Harano, Tsu (JP); Mitsuru Iida, Yokohama (JP); Shinji Hashimoto, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 181 days.

(21) Appl. No.: 10/597,637

(22) PCT Filed: Dec. 16, 2005

(86) PCT No.: PCT/JP2005/023138

§ 371 (c)(1), (2), (4) Date: Aug. 2, 2006

(87) PCT Pub. No.: WO2006/068045

PCT Pub. Date: Jun. 29, 2006

(65) Prior Publication Data

US 2008/0090450 A1 Apr. 17, 2008

(30) Foreign Application Priority Data

Dec. 22, 2004 (JP) ............................ 2004-372251

(51) Int. Cl.
*G02B 6/36* (2006.01)
*G02B 6/12* (2006.01)

(52) U.S. Cl. .......................................... 385/92; 385/14

(58) Field of Classification Search .................. 385/14, 385/16–18, 101, 92

See application file for complete search history.

(56) References Cited

U.S. PATENT DOCUMENTS

2005/0058389 A1 3/2005 Ouchi
2006/0072880 A1* 4/2006 Cheng ......................... 385/88

FOREIGN PATENT DOCUMENTS

| | | | |
|---|---|---|---|
| JP | 61-206276 | | 12/1986 |
| JP | 2001-042170 | | 2/2001 |
| JP | 2001-043934 | * | 2/2001 |
| JP | 2001-311846 | * | 9/2001 |

OTHER PUBLICATIONS

English Language Abstract of JP 2001-043934.
English Language Abstract of JP 2001-042170.

* cited by examiner

*Primary Examiner*—Charlie Peng
(74) *Attorney, Agent, or Firm*—Greenblum & Bernstein, P.L.C.

(57) ABSTRACT

An optical and electrical compound connector, which enables to transmit and to receive light signals and electric signals of a plurality of systems and to transmit and to receive these signals with respect to other electric wiring board, is achieved with downsizing and easing connection work thereof. The optical and electrical compound connector 1 is comprised of a sheet-shaped base board 2 and a socket 3 into which this base board 2 is inserted. The sheet-shaped base board 2 is a flexible base board capable of transmission and reception of the light and electric signals, in which a light guide 21 and conductor patterns 22 extended in an insertion direction 10, are formed. The socket 3 performs the transmission and reception of the light and electric signals with the sheet-shaped base board 2 and transmits and receives the signals with an electric wiring board 8. The socket 3 comprises a connector main body 4 to which the sheet-shaped base board 2 is connected, a light-sensitive element and/or a light emitting element 5 which performs the transmission and/or reception of the light signals with the light guide 21, and contacts 6 which performs the transmission and/or reception of the electric signals with the conductor patterns 22. The connector main body 4 has a first to third walls 41 to 43 enclosing the sheet-shaped base board 2 from both sides in a thickness direction and from a front end 11 side, and the light-sensitive element and/or the light emitting element 5 and the contacts 6 are disposed on any one of these walls.

4 Claims, 16 Drawing Sheets

3
4
70a
72
51
74
43d
30
41h
43
31
70a 3
4
30
37
31d
38
46
31
6
6
6

3
31
4
6
6
6
30

4
43b
43d
70
70a
72
5a, 5b
51
43g
43d
41h
46
43c
71
6
6
6

4
51
43d
41h
43

43
4
6
6
6

43
70a
51
70a
4
6

70a
71
43c
43
43d
41h
4
6
6
6

43
23
41h
2
41g
4
41g
6
6
6
6
22
21
22
22

OPTICAL AND ELECTRICAL COMPOUND CONNECTOR

TECHNICAL FIELD

The present invention relates to an optical and electrical compound connector which can transmit light signals and electric signals simultaneously.

BACKGROUND ART

In signal transmission, light signals are conventionally used for purposes of speeding up of communication, improvement of anti-noise performance and light-weighting of communication equipment. For transmitting and receiving of the light signals, optical connectors to connect optical transmission paths are used. When connecting such optical transmission paths, it may be demanded to connect electric wires simultaneously. For example, with respect to electric wiring for power supply, it is sufficient only to transmit and receive light signals without connecting electric wirings in communication between devices each having an electric power supply individually. However, in case of supplying electric power to a device or an element having no electric power supply, it is necessary ensure electric wirings for the electric power supply other than the optical transmission paths, so that an electric connector is needed to connect the electric wires. Although it is not limited for the electric power supply, an optical and electrical compound connector, which is unified for transmitting and receiving the light signals concurrently with transmitting and receiving electric signals, is effective, when the electric wires including transmission cable for electric signals is used together with the optical transmission cables.

In a conventional optical and electrical compound connector, for example, shown in Japanese Laid-Open Patent Publication No. 2001-43934, an optical connection unit and an electric connection unit are provided in a same housing, which perform transmission and reception of the light signals and the electric signals with respect to a plurality of conductive type optical fibers enabling simultaneous transmission of the light signals and the electric signals through core wires of the optical fibers and conductors formed on surfaces of the core wires.

However, in the above mentioned conventional optical and electrical compound connector, since only one electric wiring can be utilized with respect to one conductive type optical fiber, it is necessary to transmit and receive a plurality of conductive type optical fivers individually when a plurality of systems of light signals and electric signals. Thus, there is a problem that a work for connecting the connector with the optical fibers is troublesome.

DISCLOSURE OF INVENTION

The present invention solves the above mentioned problem, and is purposed to provide a compact optical and electrical compound connector which enables to transmit and receive a plurality of systems of light signals and electric signals, concurrently to transmit and receive these signals to and from another electric printed board, and to facilitate the connection work.

For achieving the above mentioned purpose, an optical and electrical compound connector in accordance with an aspect of the present invention enables to receive and/or transmit light signals and to receive and/or transmit electric signals simultaneously, and comprises:

a flexible sheet-shaped base board having a light guide or light guides provided inside thereof along an insertion direction and conductor patterns provided on a surface thereof between a front end and a rear end in the insertion direction, and enabling to transmit the light signals and the electric signals simultaneously;

a connector main body to which the sheet-shaped base board is connected;

a light-sensitive element for receiving the light signals from the light guide of the sheet-shaped base board and/or a light emitting element for transmitting light signals to the light guide of the sheet-shaped base board; and contacts performing transmission and reception of the electric signals with respect to the conductor patterns of the sheet-shaped base board; and characterized by that:

the connector main body has a first wall and a second wall enclosing the sheet-shaped base board from both side in a thickness direction thereof, and a third wall facing the front end of the sheet-shaped base board in the insertion direction; and the light-sensitive element and/or the light emitting element and the contacts are/is disposed on any one of the first wall, the second wall and the third wall.

According to such a constitution, since the sheet-shaped base board is used for a signal transmission medium, the light guides and the conductor patterns for a plurality of systems can be formed on a single sheet-shaped base board easily. Furthermore, since the transmission paths of a plurality of systems can be connected in lump with connecting a single sheet-shaped base board to the connector main body, an optical and electrical compound connector, which enables to simplify the connection work, can be realized. Still furthermore, since the transmission and reception of the light signals and the electric signals are performed in the thickness direction of the sheet-shaped base board or from front side in the insertion direction of the sheet-shaped base board, a constitution of electric contact and a constitution of optical coupling unit are simplified in comparison with the case that rod-shaped or wire-shaped conductive wires and optical fibers are connected, and thereby, a compact optical and electrical compound connector can be obtained.

BEST MODE FOR CARRYING OUT THE INVENTION

Figure 1:
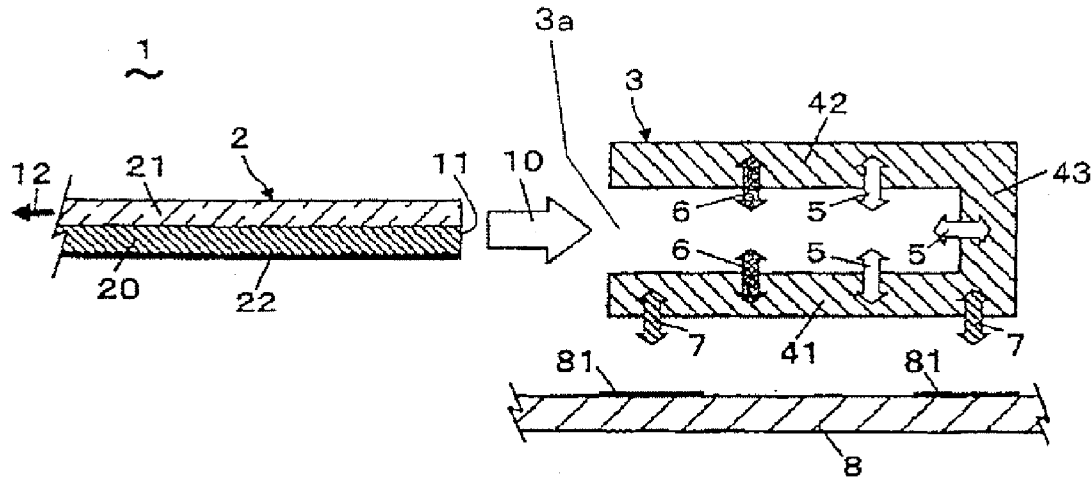
FIG. 1 is a sectional view showing a fundamental conception of an optical and electrical compound connector in accordance with the present invention.

Firstly, a fundamental conception of an optical and electrical compound connector in accordance with in the present invention is described with reference to FIG. 1. The optical and electrical compound connector 1 is comprised of a sheet-shaped base board 2 and a socket 3 to which the sheet-shaped base board 2 is inserted in an insertion direction 10. Besides, a side of a face of the socket 3 having an aperture 3*a* through which the sheet-shaped base board 2 is inserted in FIG. 1 is called "front" in the following description.

The sheet-shaped base board 2 has flexibility and comprises light guides 21 provided between a front end 11 and a rear end 12 in an inside thereof along the insertion direction, and conductor patterns 22 formed on a surface thereof. The sheet-shaped base board 2 can transmit light signals through the light guides 21, and can transmit electric signals through the conductor patterns simultaneously. In addition, the concept of the electric signals in the present invention includes a concept of electric power. Specific constitution of the sheet-shaped base board 2 will be described later.

Transmission and reception of the light signals and the electric signals are performed between the socket 2 and the sheet-shaped base board 2, and thereby, it is possible to transmit the light signals and the electric signals from an electric wiring board 8 on which the socket 3 is implemented to another electric wiring board not illustrated in the figures, or to receive the light signals and the electric signals from another electric wiring board.

The socket 3 comprises a light-sensitive element and/or a light emitting element 5 which perform or performs transmission and reception of the light signals with the light guides 21 of the sheet-shaped base board 2, contacts 6 which perform transmission and reception of the electric signals with the conductor patterns 22 of the sheet-shaped base board 2, and wiring patterns 7 which transmit electric signals between the light-sensitive element and/or the light emitting element 5 and wiring patterns 81 on the electric wiring board 8 and/or between the contacts 6 and the wiring patterns 81. Besides, specific shapes of the light-sensitive element and/or the light emitting element 5, the contacts 6 and the wiring patterns 7 are not illustrated but the locations of them are schematically indicated by arrows in FIG. 1. In addition, the light-sensitive element and/or the light emitting element 5 include or includes a signal processing element which performs signal procession for light reception and light emission and an element for driving the light-sensitive element and/or the light emitting element.

The body 4 comprises a first wall 41 and a second wall 42 which enclose the sheet-shaped base board 2 from both sides in a thickness direction thereof, and a third wall 43 which is perpendicular to these walls 41 and 42 and faces a front end 11 of the sheet-shaped base board 2 in the insertion direction 10. In FIG. 1, the light-sensitive element and/or the light emitting element 5 and the contacts 6 are illustrated at a plurality of points on the first to third walls 41, 42 and 43, they, however, may be provided at any one point each. In addition, the wiring patterns 7 which transmits the electric signals with the electric wiring board 8 is illustrated in a side of the first wall 41, it, however, is not limited to this.

As mentioned above, the optical and electrical compound connector 1 uses the sheet-shaped base board 2 on which the light guides 21 and the conductor patterns 22 for a plurality of systems are formed on a single sheet-shaped base board 2 as a medium for transmitting the light signals and the electric signals simultaneously and uses the socket 3 which comprises the first to third walls 41, 42 and 43 for enclosing a vicinity of the front end of the sheet-shaped base board 2. Furthermore, in the optical and electrical compound connector 1, the single sheet-shaped base board 2 is connected to the socket 3 in an operation, so that transmission paths for a plurality of compound systems including both of the light signals and the electric signals can easily be connected in lump.

Furthermore, the transmission and reception of the light signals and the electric signals are performed in the thickness direction of the sheet-shaped base board 2 (on an upper face or a lower face of the base board 2) or from the front side of the sheet-shaped base board 2 in the insertion direction 10 (in the side of the third wall 43 of the body 4), so that it is possible to simplify a constitution of an electric contact and a constitution of optical coupling unit in comparison with a case that rod-shaped or wire-shaped conductive wires and optical fibers are connected. Consequently, it is possible to downsize the optical and electrical compound connector 1.

In this way, according to the optical and electrical compound connector 1 in accordance with the present invention, the transmission and reception of the light signals and the electric signals can be performed easily and simultaneously between the circuit boards on which electric elements are implemented through the socket 3 (SIC) and the sheet-shaped base plate 2, and thereby, simplification of electric wiring between the base boards and speeding up of signal transmission can be realized.

FIRST EMBODIMENT

Figure 2A:
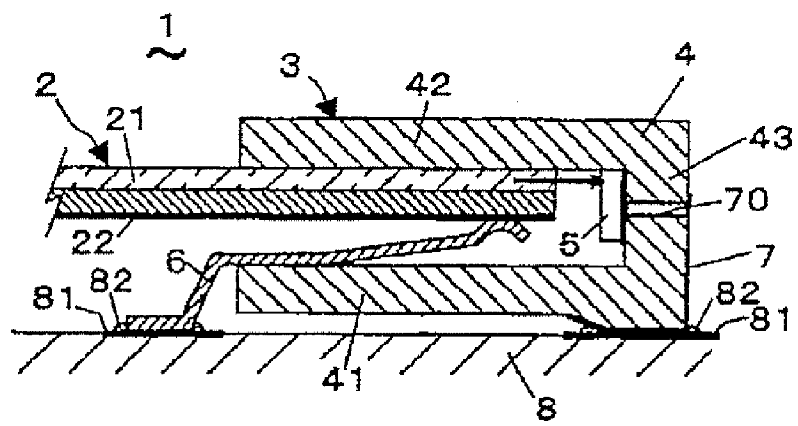
FIG. 2A is a sectional view showing a constitution of an optical and electrical compound connector in accordance with the first embodiment of the present invention.

Subsequently, a specific configuration of the optical and electrical compound connector 1 in accordance with a first embodiment of the present invention is shown FIG. 2A. As shown in FIG. 2A, in the optical and electrical compound connector 1 in accordance with the first embodiment, the light-sensitive element and/or the light emitting element 5 are/is disposed on a front face of the third wall 43 of the body 4 of the socket 3, and the contacts 6 are provided on the first wall 41 side. The sheet-shaped base board 2 is inserted so that the conductor patterns 22 face the first wall 41 side. The conductor patterns 22 and the contacts 6 are electrically connected under a pressurized condition, and the contacts 6 and the wiring patterns 81 of the electric wiring board 8 are electrically connected with solders 82.

The light guides 21 of the sheet-shaped base board 2 are optically coupled with the light-sensitive element and/or the light emitting element 5 so that end faces of the light guides 21 perpendicular to the optical axis directly face a light receiving face and/or a light emitting face of the light-sensitive element and/or the light emitting element 5 implemented on the front face of the third wall 43 as indicated by arrow in the figure. The light-sensitive element and/or the light emitting element 5 are/is electrically connected to the wiring patterns 81 of the electric wiring board 8 with solders 82 through vias 70 penetrating through the third wall 43 of the body 4 and the wiring patterns 7 provided on inner and outer faces of the third wall 43.

In the optical and electrical compound connector 1 in accordance with the first embodiment, the end faces of the light guides 21 in the insertion direction of the sheet-shaped base board 2 and the light-sensitive element and/or the light emitting element 5 directly perform the transmission and reception of the light signals without intermediating reflection face, so that optical coupling can be performed without reducing coupling efficiency. Furthermore, no reflection face is used, so that the constitutions of the sheet-shaped base board 2 and the socket 3 can be simplified.

Figure 2B:
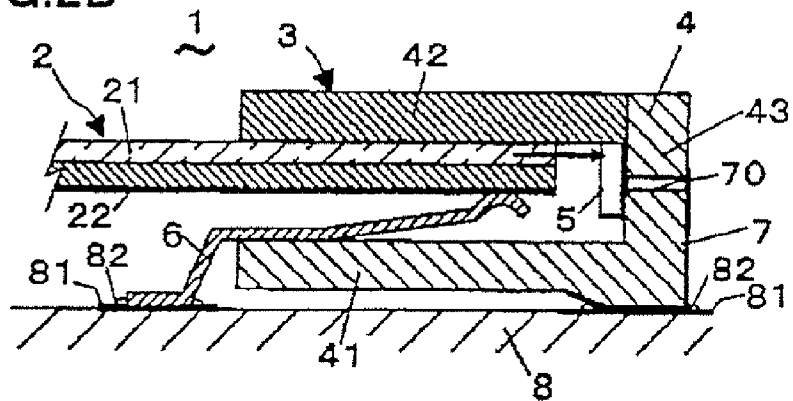
FIG. 2B is a sectional view showing a constitution of a modification of the optical and electrical compound connector in accordance with the first embodiment.

A modified example of the optical and electrical compound connector 1 in accordance with the first embodiment is shown in FIG. 2B. In this modification, the upper face of the socket 3, that is, the second wall 42 of the body 4 is formed as movable or detachable cover. With respect to the optical and electrical compound connector 1 having a movable cover will be described in a sixth embodiment.

SECOND EMBODIMENT

Figure 3:
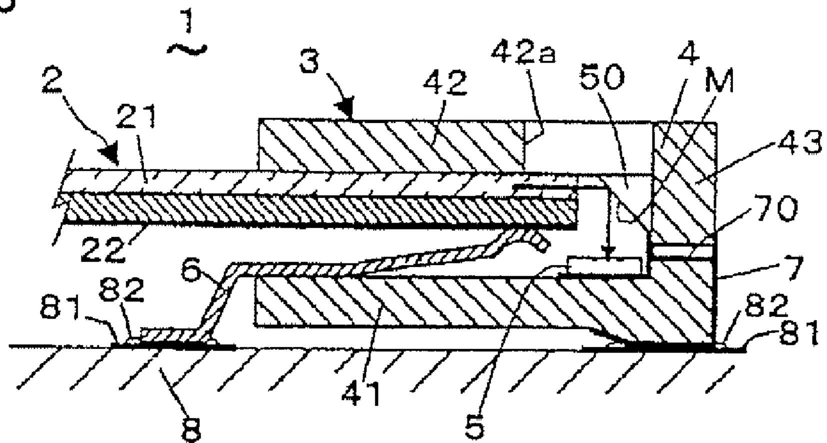
FIG. 3 is a sectional view showing a constitution of an optical and electrical compound connector in accordance with a second embodiment of the present invention.

Subsequently, a specific constitution of an optical and electrical compound connector 1 in accordance with a second embodiment of the present invention is shown in FIG. 3. As shown in FIG. 3, in the optical and electrical compound connector 1 in accordance with the second embodiment, the light-sensitive element and/or the light emitting element 5 are/is disposed on the first wall of the body 4, and a reflection face M is provided at a corner between the second wall 42 and the third wall 43 on which the light-sensitive element and/or the light emitting element 5 are/is not disposed. As for the reflection face M, for example, a slanted face of a prism 50 can be used. In addition, an aperture 42, which is used for an operation of implementation of the light-sensitive element and/or the light emitting element 5, is formed on the second wall 42 of the body 4. Other constitutions are similar to those in case of the above first embodiment.

According to the optical and electrical compound connector 1 in accordance with the second embodiment, a light emitted from, for example, the light guide 21 of the sheet base board 2 is reflected on the reflection face M, and enters into the light receiving face of the light-sensitive element 5, so that the light guide 21 and the light-sensitive element 50 (SIC) are optically coupled. On the other hand, a light emitted from the light emitting element 5 is reflected on the reflection face M and enters into the light guide 21 of the sheet-shaped base board 2. In addition, the light signals can be transmitted and received with disposing the light-sensitive element and/or the light emitting element 5 in the thickness direction of the sheet-shaped base board 2 without processing any particular work on the end face of the light guide 21 in the insertion direction 10 of the sheet-shaped base board 2.

THIRD EMBODIMENT

Figure 4:
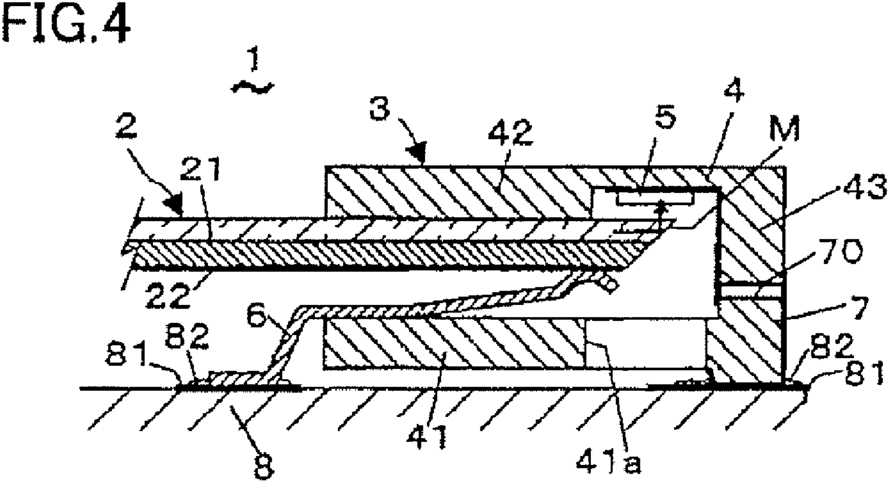
FIG. 4 is a sectional view showing a constitution of an optical and electrical compound connector in accordance with a third embodiment of the present invention.

Subsequently, a specific constitution of an optical and electrical compound connector 1 in accordance with a third embodiment of the present invention is shown in FIG. 4. As shown in FIG. 4, in the optical and electrical compound connector 1 in accordance with the third embodiment, the end face of the light guide 21 in the insertion direction 10 of the sheet-shaped base board 2 is polished to be slanted, for example, 45 degrees, and the end face of the light guide 21 is used as the reflection face M with no processing or with evaporation of reflection film on the end face of the light guide 21. The light-sensitive element and/or the light emitting element 5 are/is disposed in a recess formed on the second wall 42 of the body 4. In addition, an aperture 41*a*, which is used for an operation of implementation of the light-sensitive element and/or the light emitting element 5, is formed on the first wall 41 of the body 4.

According to the optical and electrical compound connector 1 in accordance with the third embodiment, a light moved in the light guide 21 of the sheet-shaped base board 2 is reflected by the reflection face M on the end face of light guide 21 and emitted from a side face of the light guide 21. Furthermore, the light emitted from the side face of the light guide 21 enters into the light receiving face of the light-sensitive element 5, so that the light guide 21 and the light-sensitive element 5 are optically coupled. On the other hand, a light emitted from the light emitting element 5 enters into the side face of the light guide 21 and reflected by the reflection face M on the end face of the light guide 21, and moves in the light guide of the sheet-shaped base board 2 in the opposite direction. According to such a constitution, although it is necessary to process the end face of the light guide 21 of the sheet-shaped base board 2, it is no need to provide a prism on the socket 3, so that the constitution of the socket 3 can be simplified.

FOURTH EMBODIMENT

Figure 5:
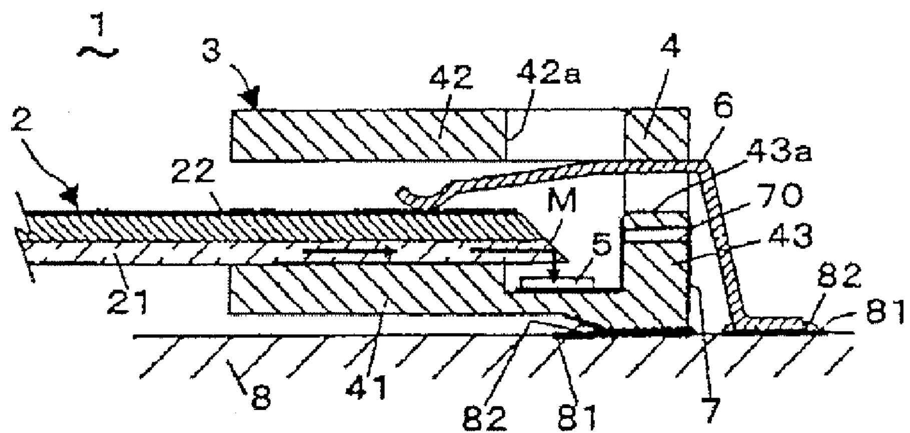
FIG. 5 is a sectional view showing a constitution of an optical and electrical compound connector in accordance with a fourth embodiment of the present invention.

Subsequently, a specific constitution of an optical and electrical compound connector 1 in accordance with a fourth embodiment of the present invention is shown in FIG. 5. As shown in FIG. 5, in the optical and electrical compound connector 1 in accordance with the fourth embodiment, the end face of the light guide 21 in the insertion direction 10 of the sheet-shaped base board 2 is polished to be slanted, for example, 45 degrees, and the end face of the light guide 21 is used as the reflection face M with no processing or with evaporation of reflection film on the end face of the light guide 21, similar to those in the case of the third embodiment. On the other hand, the light-sensitive element and/or the light emitting element 5 are/is disposed in a recess formed on the first wall 41 of the body 4. In addition, an aperture 42*a*, which is used for an operation of implementation of the light-sensitive element and/or the light emitting element 5, is formed on the second wall 42 of the body 4.

Furthermore, the contacts 6 are provided on the second wall 42 side with penetrating through holes 43*a* formed to the third wall 43 of body 4. End portions of the contacts 6 are electrically connected to the wiring patterns 81 of the electric wiring board 8 with the solders 82. The sheet-shaped base board 2 is inserted so that the conductor patterns 22 face the second wall 42 side, so that the conductor patterns 22 and the electric wiring board 8 are electrically connected through the contacts 6.

FIFTH EMBODIMENT

Figure 6:
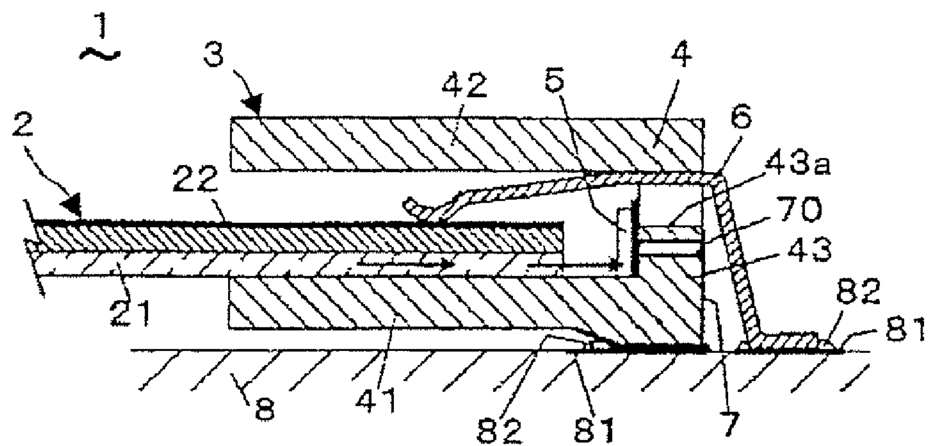
FIG. 6 is a sectional view showing a constitution of an optical and electrical compound connector in accordance with a fifth embodiment of the present invention.

Subsequently, a specific constitution of an optical and electrical compound connector 1 in accordance with a fifth embodiment of the present invention is shown in FIG. 6. As shown in FIG. 6, in the optical and electrical compound connector 1 in accordance with the fifth embodiment, the light-sensitive element and/or the light emitting element 5 are/is disposed on the front face of the third wall 43 in the socket 3, and the contacts 6 are provided on the second wall 42 side. The end portions of the contacts 6 are electrically connected to the wiring patterns 81 of the electric wiring board 8 with solders 82. The sheet-shaped base board 2 is inserted so that the conductor patterns 22 face the second wall 42 side, and thereby, the conductor patterns 22 and the electric wiring board 8 are electrically connected with the contacts 6.

In the optical and electrical compound connector 1 in accordance with the fifth embodiment, the end face of the light guide 21 in the insertion direction 10 of the sheet-shaped base board 2 and the light-sensitive element and/or the light emitting element 5 directly perform the transmission and reception of the light signals without intermediating the reflection face similar to the case of the first embodiment, the optical coupling can be performed without reducing the coupling efficiency. In addition, since the reflection face is not used, the constitutions of the sheet-shaped base board 2 and the socket 3 can be simplified.

Figure 7A:
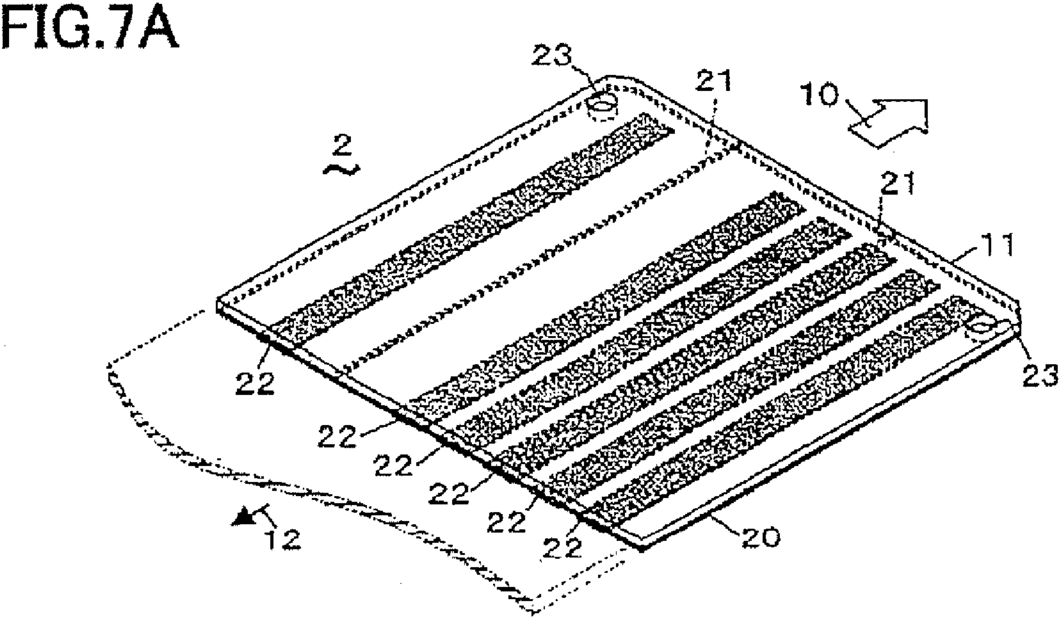
FIG. 7A is a perspective view showing a constitution of a front end portion in an embodiment of a sheet-shaped base board which is used for the optical and electrical compound connector of each embodiment mentioned above.
Figure 7B:
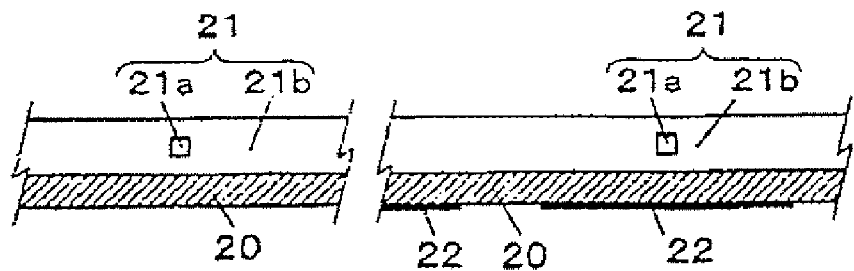
FIG. 7B is a partial sectional view showing a constitution of a face which is perpendicular to an insertion direction of the sheet-shaped base board mentioned above.

Hereupon, the sheet-shaped base board 2 in accordance with each embodiment of the present invention is described with reference to FIGS. 7A and 7B. The sheet-shaped base board 2 is formed with integration of a base board including the light guide 21 adhered or laminated on a so-called FPC board (FPC: Flexible Printed Circuit) that the conductor patterns 22 are formed on a base material 20 having flexibility.

As shown in FIG. 7, an outer shape of the sheet-shaped base board 2 is, for example, a form of belt of a constant width that the front end 11 and the rear end 12 serve as input-output portions. When it is used in the embodiments shown in FIG. 2A, FIG. 2B, FIG. 3 and FIG. 6, the end faces of the front end 11 and the rear end 12 are polished so as to be orthogonal with respect to a longitudinal direction thereof. Alternatively, when it is used in the embodiments shown in FIG. 4 and FIG. 5, the end faces of the front end 11 and the rear end 12 are polished so as to be slanted, for example, 45 degrees, and the reflection film is evaporated according to need. Furthermore, an engagement hole 23 which is engaged with an engaging portion, for example, provided on the first wall 41 of the body 4 for positioning is formed in a vicinity of each of the front end 11 and the rear end 12 of the sheet-shaped base board 2.

The light guide 21 is comprised of a core 21*a* in which light moves with being guided, and a clad 21*b* which is formed to surround the core 21*a* for closing up the light in the core 21*a*. As shown in FIGS. 7A and 7B, the core 21*a* of the light guide is formed parallel to the insertion direction 10 between the front end 11 and the rear end 12 in the clad 21*b*. In addition, the conductor patterns 22 are formed parallel to the insertion direction 10 between the front end 11 and the rear end 12 on a surface of the sheet-shaped base board 2. Besides, a protection film for insulation (not illustrated) is formed on a portion except the portion to be inserted into the socket 3 that is, the portion except the vicinities of the front end 11 and the rear end 12 among the conductor patterns 22. The sheet-shaped base board 2 exemplified in FIG. 7A has two light guides 21 and six conductive patterns so that light signals of two systems and electric signals of six systems at a maximum can be transmitted.

SIXTH EMBODIMENT

Subsequently, an optical and electrical compound connector 1 in accordance with a sixth embodiment of the present invention is described. As described in the respect of the modified embodiment in the first embodiment shown in FIG. 2B, the second wall 42 of the body 4 in the optical and electrical compound connector 1 in accordance with the sixth embodiment is formed as a movable cover.

Figure 8A:
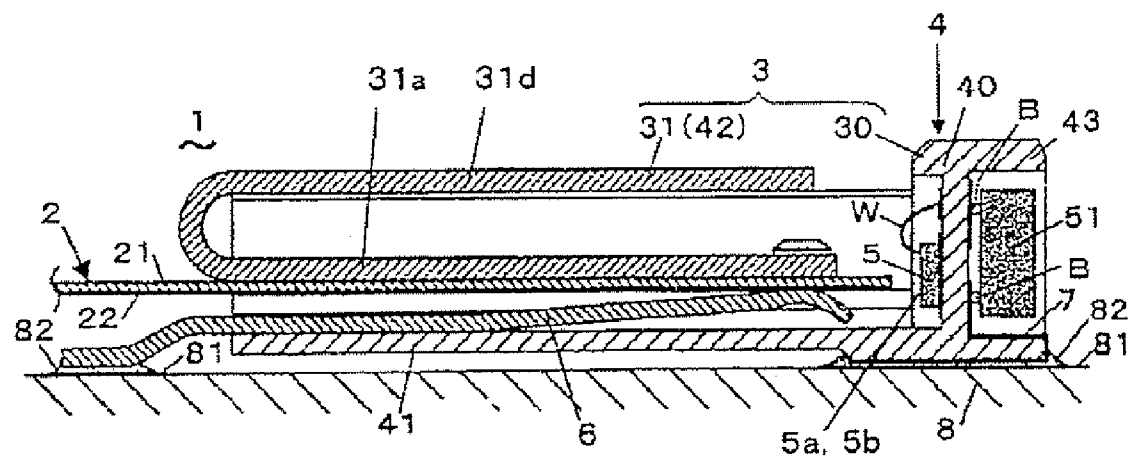
FIG. 8A is a sectional view showing a constitution of an optical and electrical compound connector in accordance with a sixth embodiment of the present invention.
Figure 8B:
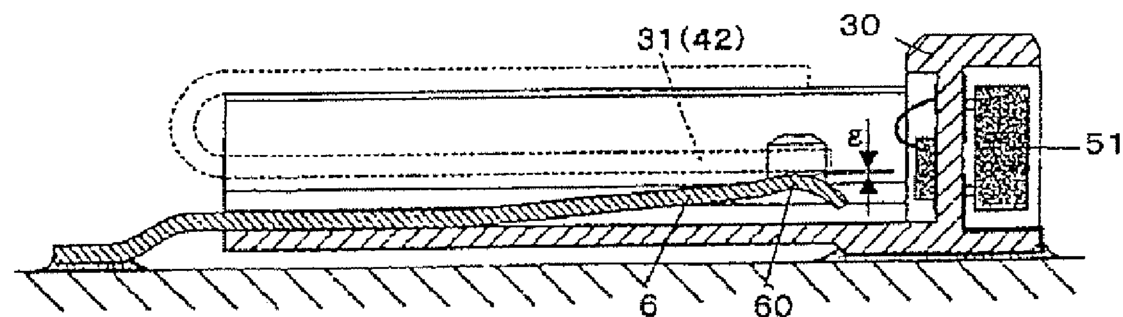
FIG. 8B is a sectional view showing a condition that a sheet-shaped base board and a cover are excluded from the optical and electrical compound connector shown in FIG. 8A.

FIG. 8A shows a state that the optical and electrical compound connector 1 is used, and FIG. 8B shows a state that the sheet-shaped base board 2 and the second wall 42 (a cover 31) are excluded from the optical and electrical compound connector 1. In the optical and electrical compound connector 1 in accordance with the sixth embodiment, the body 4 has only the first wall 41 and the third wall 43, and the cover 31 forming the second wall 42 is attached so that it is rotatable between an opened state and a closed condition with respect to this body 4.

Figure 9:
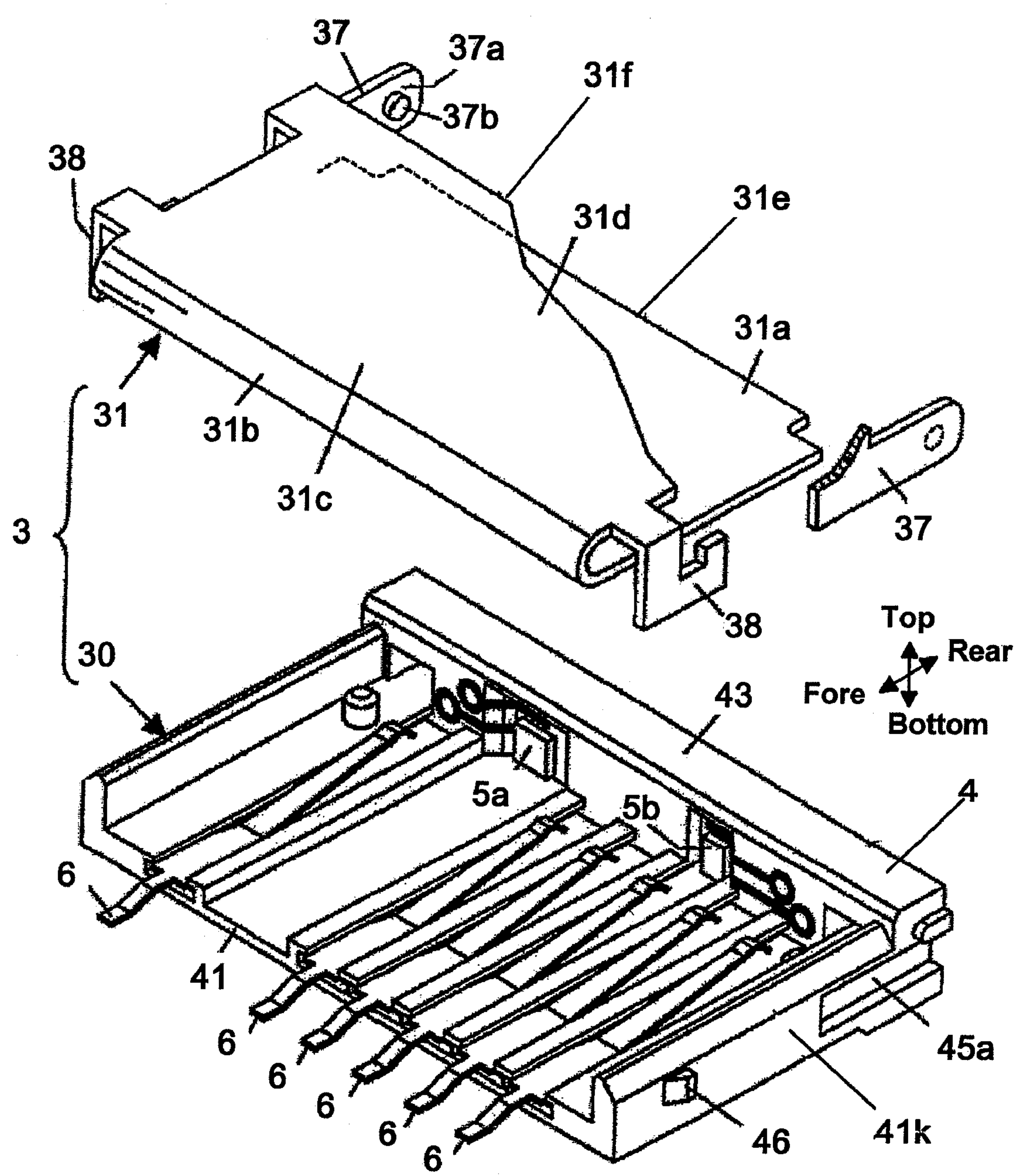
FIG. 9 is an exploded perspective view showing a constitution of a socket in the optical and electrical compound connector in accordance with the sixth embodiment mentioned above.

The cover 31 is formed of a metal plate with press working. As shown in FIG. 8A, a center portion of the cover 31 has a substantially U-shaped section in a plane parallel to the insertion direction 10 of the sheet-shaped base board 2 and perpendicular to an arrangement direction of the conductor patterns 22 of the sheet-shaped base board 2. Furthermore, as shown in FIG. 9, the center portion of the cover 31 has two of an inside flat plate portion 31*a* and an outside flat plate portion 31*d* parallel each other to constitute the substantially U-shaped section. The inside flat plate portion 31 a serves as a contacting portion for pressing the sheet-shaped base board 2 to the contacts 6, and the outside flat plate portion 31*d* serves as a main covering body of the cover 31.

According to the optical and electrical compound connector 1 in accordance with the sixth embodiment, when the cover 31 is closed after disposing the sheet-shaped base board 2 on the body 4, the inside flat plate portion 31 pressed the sheet-shaped base board 2 uniformly, so that the conductor patterns 22 and the contacts 6 are electrically contacted. Simultaneously, the sheet-shaped base board 2 is fixed on the connector 3 (SIC). Thereby, even when the sheet-shaped base board 2 is soft, the connection work can easily be performed.

A protrusion 60, which protrudes to contact with the conductor pattern 22 of the sheet-shaped base board 2, is formed in a vicinity of a front end of each contact 6. As shown in FIG. 9, a plurality of contacts 6 is arranged on the first wall 41 corresponding to the conductive patterns 22 of the sheet-shaped base board 2.

Under a state that the cover 31 is closed without connecting the sheet-shaped base board 2, a measure "g" of a clearance between the protrusion 60 of the contact 6 and the second wall 42 is set to be smaller than a measure of a thickness of the sheet-shaped base board 2, as shown in FIG. 8B. Thus, the conductor patterns 22 are pressed to the protrusions 60 of the contacts 6 when the cover 31 is closed, so that the conductor patterns 22 of the sheet-shaped base board 2 and the contacts 6 are electrically connected surely.

The third wall 43 of the body 4 has concavities on a front face and a rear face in the insertion direction 10 of the sheet-shaped base board 2, respectively. A light-sensitive element 5*a* and a light emitting element 5*b* are implemented in the concavities formed on the front face side, and integrated circuit chips 51, which perform transmission and reception of electric signals with the light-sensitive element 5*a* and the light emitting element 5*b*, and drive the light-sensitive element 5*a* and the light emitting element 5*b*, are implemented in the concavities formed on the rear face side. As for the light-sensitive element 5*a* and the light emitting element 5*b* implemented in the concavities on the front face side of the third wall 43, electrodes on front faces of them are electrically connected to wiring patterns through, for example, bonding wires "W", and electrodes on rear faces of them are electrically connected to wiring patterns through electro-conductive adhesive. The integrated circuit chips 51 implemented in the concavities on the rear face side of the third wall 43 are implemented flip-chip on wiring patterns through conductor balls and bumps "B".

As shown in FIG. 9, the socket 3 is comprised of the cover 31 and a socket base 30 having a structure of movable shell. As for the socket base 30, the light-sensitive element 51, the light emitting element 5*b* and the like, are implemented on the body 4 having the first wall 41 and the third wall 43, and the contacts 6 are fixed thereon.

The inside flat plate portion (a contacting piece) 31*a* in the center portion of the cover 31 contacts the sheet-shaped base board 2 in a state of closing the cover 31, and thereby, presses the sheet-shaped base board 2 to the contacts 6 arranged on the first wall 41 of the body 4. The inside flat plate portion 31*a* is coupled to the outside flat plate portion 31*d* only in curvature portion 31*b* forming the substantially U-shape, and both sides of it and an end portion 31*e* are not restricted to be free ends. Thus, the inside flat plate portion 31*a* becomes a cantilever state, and can generate an elastic force for pressing the sheet-shaped base board 2 to the contacts 6.

A pair of rotation shaft portion 37 each having a rotation shaft 37*b* for rotation of the cover 31 is formed on both sides and in a vicinity of an end portion 31*d* of the outside flat plate portion 31*d* serving as the main cover body. Each rotation shaft portion 37 is formed with bending each side of the outside flat plate portion 31*d* substantially at right angle toward the inside flat plate portion 31*a*, and also has an arm 37*a* protruding outward (toward the third wall 43) from the end portion 31*f*. The rotation shaft 37*b* is formed on each arm 37*a*. Each rotation shaft 37*b* is engaged with a bearing groove 45*a* formed on each side face of the body 4 in a widthwise direction, so that it is borne therein when rotating. Under a state that the rotation shaft 37*a* is engaged with the bearing groove 45 of the body 4, the cover 31 can be rotated around the rotation shaft 37*a* (SIC). Simultaneously, the cover 31 can be moved in parallel or moved with rotation with sliding the rotation shaft 37*a* along the bearing groove 45 (SIC).

A pair of hooks 38 is formed on both sides of the outside flat plate portion 31*d* in a vicinity of the curvature portion 31*b* with bending them substantially at right angle toward the inside flat plate portion 31*a*. Under a state of closing the cover 31, when the cover 31 is moved in parallel to the first wall 41 of the body 4, each hook 38 climbs over a hooking protrusion 46 formed on each side face of the body 4, so that it is hooked with the hooking protrusion 46. Thus, the cover 31 is fixed on the body 4 (or the socket base 30).

As for the socket base 30, the light-sensitive element 51, the light emitting element 5*b* and the like, are implemented on the body 4 having the first wall 41 and the third wall 43, and the contacts 6 are fixed thereon, as mentioned above. Detailed constitution of the socket base 30 is described.

Figure 10A:
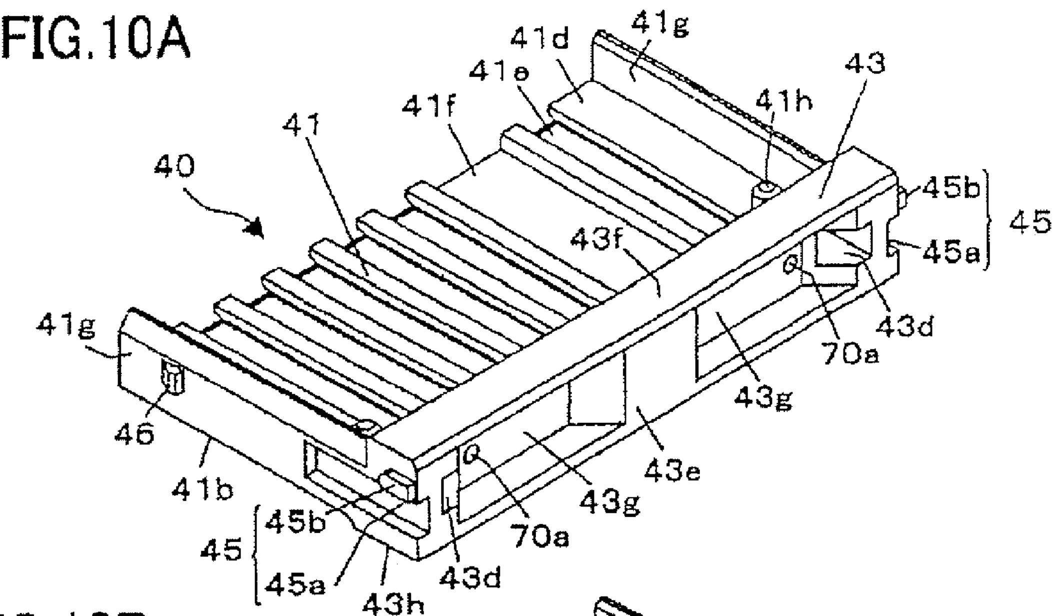
FIG. 10A is a perspective view showing a constitution of a body constituting a socket shown in FIG. 9.

FIG. 10A is a perspective view showing the constitution of the body 4, and FIGS. 11A to 11D are respectively a rear view, a plain, a front view and a side view of the body 4. The body 4 is formed of, for example, an insulating resin. The body 4 has a constitution that front and top thereof are opened, and side walls 41*g* are formed upwardly on both side of the first wall 41. Furthermore, the third wall 43 which is higher than the sidewalls 41*g* is integrally formed with the first wall 41 at front end of the first wall 41. Both of a bottom face 41*b* of the first wall 41 and a bottom face 43*h* of the third wall 43 are flat, the bottom face 43*h* of the third wall 43 is protruded below the bottom face 41*b* of the first wall 41, and they both are connected through a slanted face. Still furthermore, a top face 43*f* of the third wall 43 is flat.

Grooves 41*e* to which the contacts 6 are fixed, a groove 41 which enables to make the implementation of the light-sensitive element or the light emitting element 5 easy, and protruded engaging portions 41*h* which are engaged with the engagement hole 23 of the sheet-shaped base board 2 are formed on an inside face 41*d* (a top face) of the first wall. Guiding grooves 41*j* which guide the contact 6 are formed on the bottom of each groove 41*e* for the contact 6 in the widthwise direction. Furthermore, the hooking protrusions 46 for hooking the hooks 38 of the cover 31 are formed on both side faces of the side walls 41g in the vicinities of the rear ends thereof.

Concavities 43g, in which the integrated circuit chips 51 are implemented, are formed on a rear face 43e of the third wall 34, and concavities 43c, in which the light-sensitive element 5a and the light emitting element 5b are implemented, are formed on a front face 43b. Furthermore, via holes 70a, to which the above mentioned vias 70 are formed, are formed to penetrate through the third walls 43 from the front face 43b to the concavities 43g of the third wall 43. Still furthermore, through holes 43d penetrating through the third wall 43 are formed outside of the concavities 43g in the widthwise direction.

Besides, the via holes 70a are formed to avoid the concavities 43c. After implementation of the light-sensitive element 5a and the light emitting element 5b into the concavities 43c, and the implementation of the integrated circuit chips 51 into the concavities 43g, sealing resin is filled into the concavities 43c and 43g respectively, so that the light-sensitive element and the light emitting element 5 and the integrated circuit chips 51 are sealed. At that time, if the via holes 70a were formed in the concavities 43c, the sealing resin might flow into the via holes 70a. Even if the sealing resin flowed into the via holes 70a, air bubbles might remain in the via holes 70a due to viscosity of the sealing resin. When the air bubbles remained in the via holes 70a, crack might occur in the sealing resin layer due to discrepancy of thermal expansion coefficients, so that deterioration of the connector might be accelerated. For preventing the deterioration of the connector, the via holes 70 (SIC) are formed with avoiding the concavities 43c as mentioned above.

Shaft engagement portions 45, each constituted with the bearing groove 45a to which the rotation shaft 37 of the above mentioned cover 31 is engaged, an engaging protrusion 45b, and so on, are formed from both side walls 41g of the first wall 41 to both end faces of the third wall 43 in the widthwise direction.

Figure 10B:
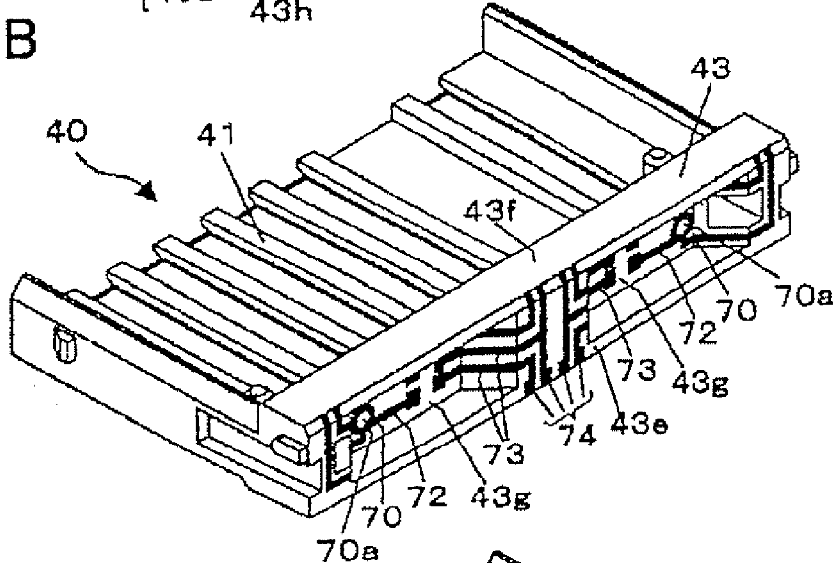
FIG. 10B is a perspective view showing a condition that conductor patterns are formed on the above body.
Figure 10C:
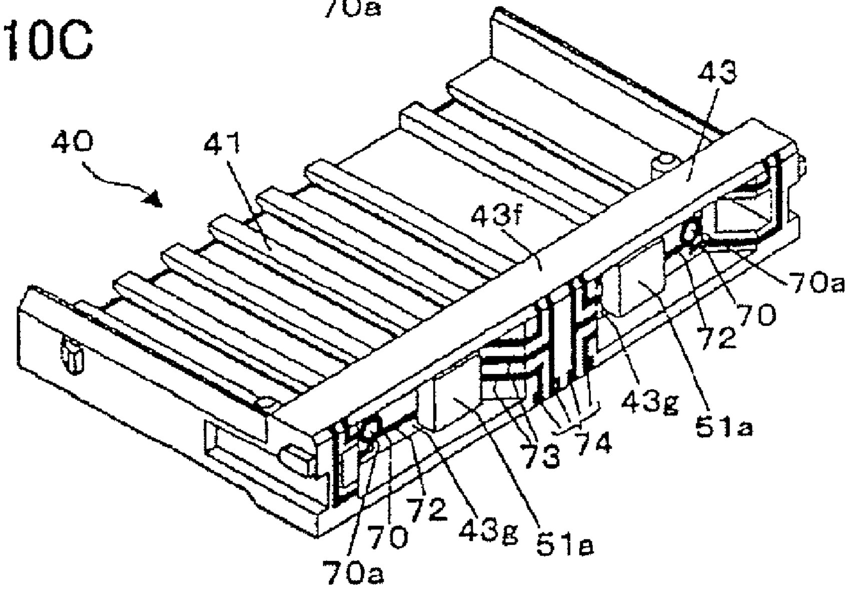
FIG. 10C is a perspective view showing a condition that an integrated circuit chip is implemented on the above body.
Figure 11A:
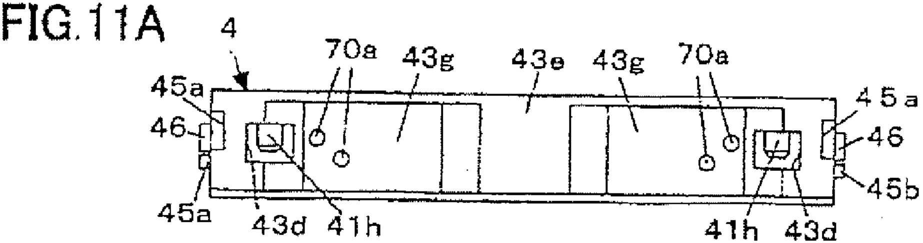
FIG. 11A is a rear view showing a constitution of the above body.
Figure 11B:
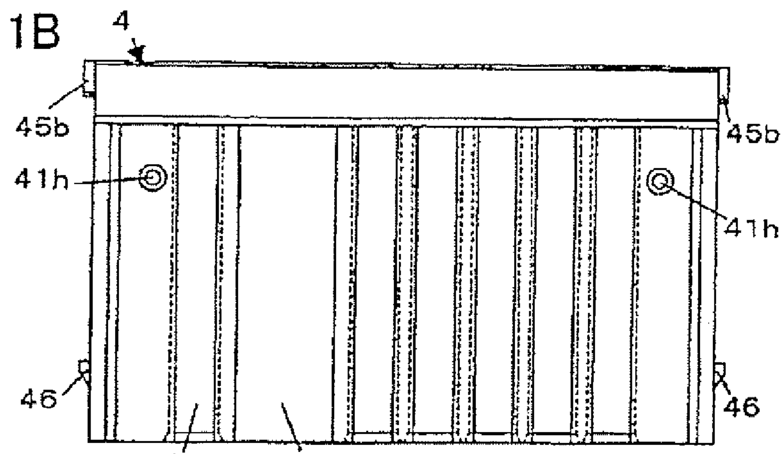
FIG. 11B is a plain view showing the constitution of the above body.
Figure 11D:
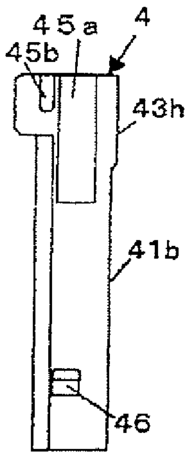
FIG. 11D is a side view showing the constitution of the above body.
Figure 11C:
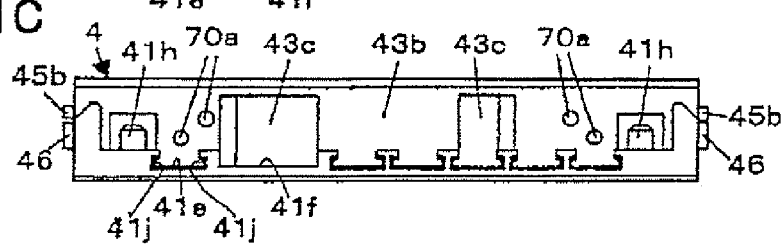
FIG. 11C is a front view showing the constitution of the above body.

Subsequently, circuit patterns (wiring patterns) are formed on surfaces of the body 4, especially on the front face and the rear face of the third wall 43, as shown in FIG. 10B. Thereby, a three-dimensional circuit board is constituted. In addition, a state that the light-sensitive element 5a and the light emitting element 5b (the light-sensitive element and/or the light emitting element 5) are implemented into the concavities 43c is shown in FIGS. 12B and 13. Furthermore, a state that the integrated circuit chips 51a and 51b are implemented into the concavities 43g is shown in FIGS. 10C and 12A.

The circuit pattern is constituted with conductor patterns 71 electrically connected to front faces and rear faces of the light-sensitive element 5a and the light emitting element 5b implemented into the concavities 43c respectively, the vias 70 introducing these conductor patterns 71 to the concavities 43g on the rear face, conductor patterns 72 connecting the vias 70 with the integrated circuit chips 51a and 51b, and conductor patterns 74 connecting the integrated circuit chips 51a and 51b with the electric wiring board 8 (not illustrated). The conductor patterns 74 are introduced to the bottom face 43h of the body 4.

Subsequently, formation of the circuit pattern on the three-dimensional circuit board is described. Firstly, conductor films are formed on the body 4 with evaporation, or the like. Secondly, patterns for electroplating are formed with, for example, irradiating laser beams to the conductor films. In other words, conductor film removed areas are formed with irradiating the laser beams for insulating areas to which electroplating is performed from areas to which electroplating is not performed. Subsequently, the electroplating is performed to the area to which electroplating is performed so as to grow the thickness of the circuit patterns, and after that, the conductor films on the area to which the electroplating is not performed are removed with etching slightly. Inner faces of the via holes 701 are plated during the electroplating, the vias 70 are formed. After that, tie bars used for the electroplating are removed, so that individual independent conductor patterns are formed.

Figure 12A:
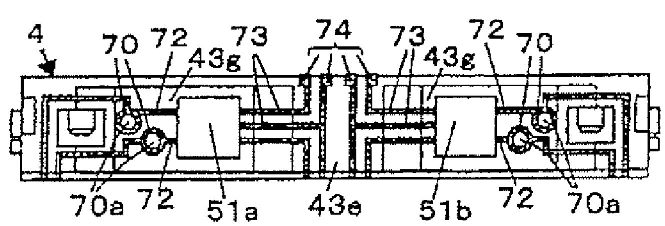
FIG. 12A is a rear view showing a state that a light-sensitive element, a light emitting element and an integrated circuit chip are implemented on the above body.
Figure 12B:
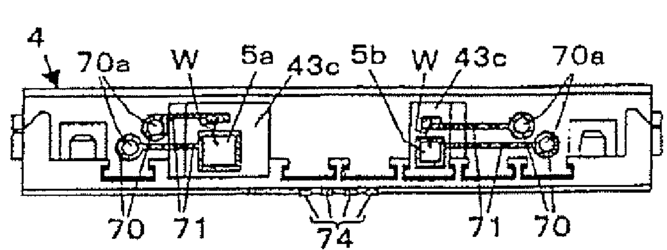
FIG. 12B is a front view showing the state that the light-sensitive element, the light emitting element and the integrated circuit chip are implemented on the above body.
Figure 13:
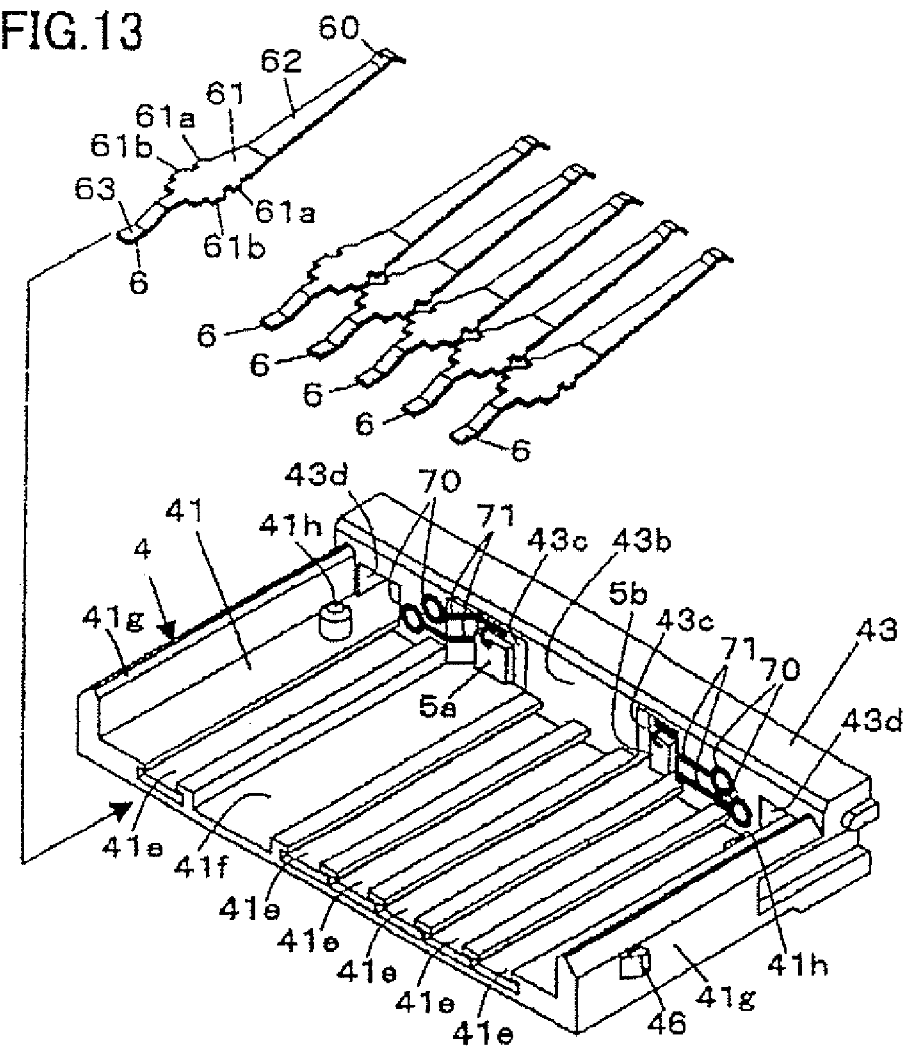
FIG. 13 is an exploded perspective view showing a state that contacts are implemented on the above body on which the light-sensitive element, the light emitting element and the integrated circuit chip are implemented.

Besides, conductor patterns proceeding toward the top face 43f of the third wall 43 in FIG. 12A are the conductor patterns for supplying currents in the plating, and were connected to the tie bars (removed in the figure) for electroplating formed on the top face 43f.

Electric connection between the light-sensitive element 5a and the light emitting element 5b and the circuit patterns are realized with wire bonding using Au wires "W" with respect to the front faces of the elements and adhesion using Ag paste with respect to the rear faces of the elements. The integrated circuit chips 51a and 51b are respectively implemented with bump implementation method, or the like. The light-sensitive element 5a and the light emitting element 5b implemented into the concavities 43c are sealed with resin by filling the sealing resin into the concavities 43c as mentioned above. The integrated circuit chips 51a and 51b may be sealed with resin, similarly. In addition, the integrated circuit chips 51a and 51b may be implemented on the electric wiring board 8 instead of the body 4.

Subsequently, the contacts 6 and the attachment of the contacts 6 on the body 4 are described. When the contacts 6 are attached to the body 4 on which the light-sensitive element 5a, the light emitting element 5b and the integrated circuit chips 51a and 51b are implemented, the socket base 30 is completed.

As shown in FIG. 13, the contact 6 of a plate spring shape is comprised of a fixed portion 61 which is flat and disposed at a center portion and has a wide width, a spring portion 62 extended from the fixed portion 61 toward the third wall 43, the protrusion 60 at the front end of the spring portion 62, an outside connection portion 63 extended with curvature from the fixed portion 61 toward the opposite side of the third wall 43, and so on. Furthermore, pawls 61a to be guided and pawls 61b to be press-fitted are serially formed from the third wall 43 on both sides of the fixed portion 61 in the widthwise direction.

Figure 14A:
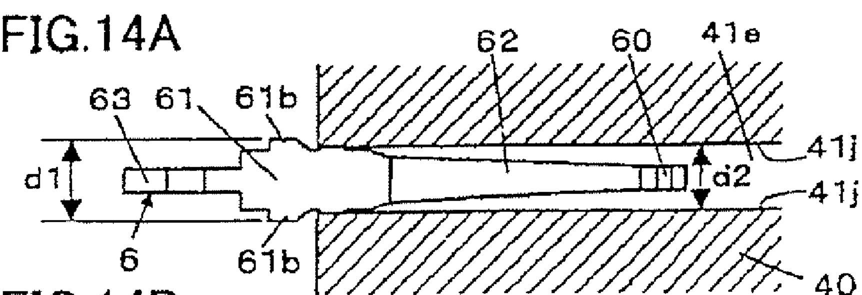
FIG. 14A is a sectional plain view showing a structure to attach an electric contact to the above body.

As shown in FIG. 14, since a width between the pawls 61a to be guided is substantially the same as a width between the guiding grooves 41j formed on the groove 41e, the posture of the contact 6 against the groove 41e becomes stable with engaging the pawls 61a to be guided with the guiding grooves 41j. In addition, since a width d1 between the pawls 61b to be press-fitted is wider than the width d2 between the guiding grooves 41j, a difference d1–d2 of them serves as a margin of press-fitting. Consequently, a structure by which the contact 6 is easily inserted but hardly pulled out can be obtained.

Figure 14B:
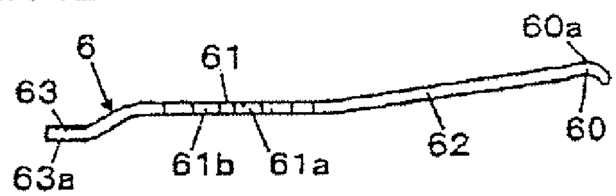
FIG. 14B is a side view showing a constitution of the electric contact.

As shown in FIG. 14B, since a top face 60a of the protrusion 60 of the contact 6 is a portion to be contacted with the conductor pattern 22 of the sheet-shaped base board 2, it is formed as a smooth surface. A bottom face 63a of the outside connection portion 63 is a portion to be soldered on the wiring pattern 81 of the electric wiring board 8.

Figure 15A:
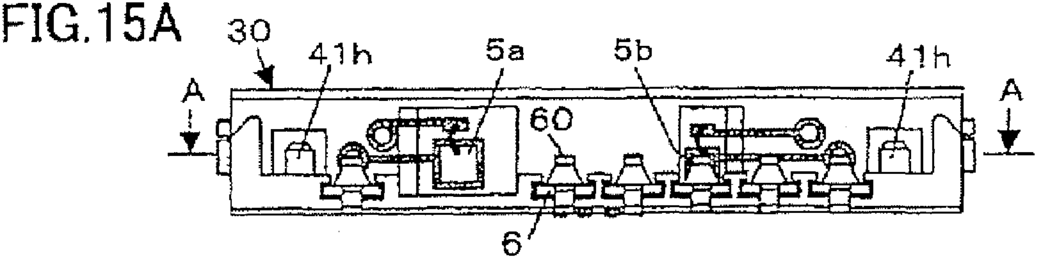
FIG. 15A is a front view showing a constitution of a socket base which is formed with implementation of the light-sensitive element, the light emitting element, and the integrated circuit chip on the above body.
Figure 15B:
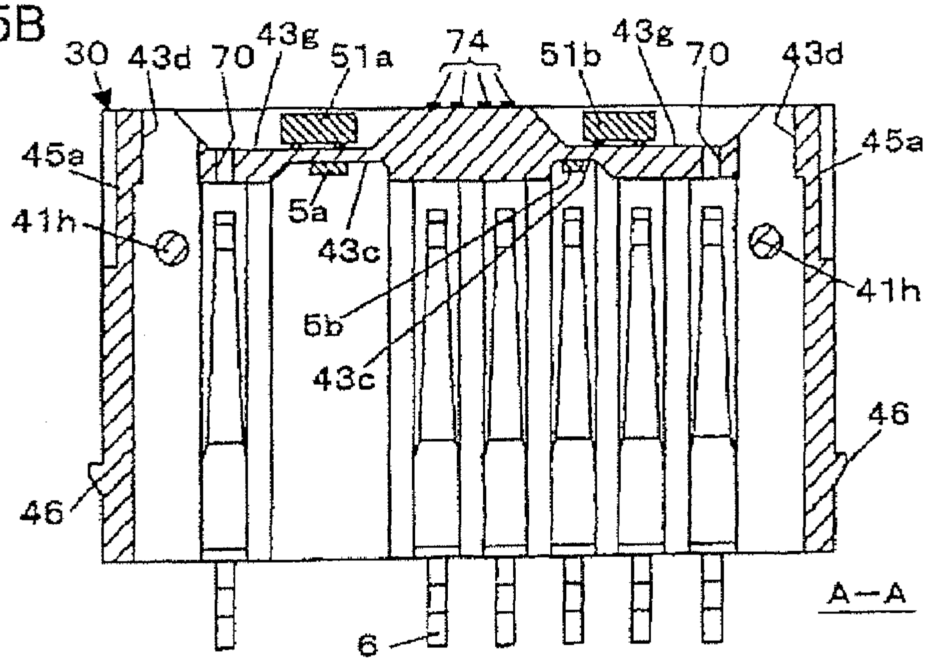
FIG. 15B is an A-A sectional view of FIG. 15A.

The socket base 30 formed as above is shown in above FIG. 9, and FIGS. 15A and 15B. FIG. 15A is a front view of the socket base 30, and FIG. 15B is an A-A sectional view of it.

Figure 16:
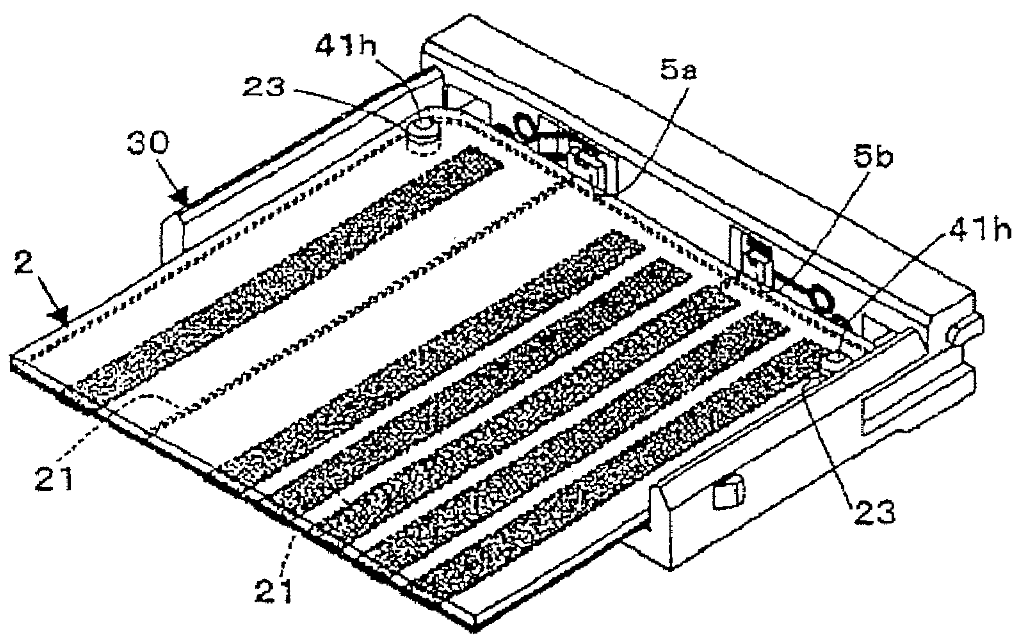
FIG. 16 is a perspective view showing a state that the sheet-shaped base board is located on the socket base shown in FIG. 9.

Subsequently, a process for connecting the sheet-shaped base board 2 to the socket 3 is described. FIG. 16 shows a state that the sheet-shaped base board 2 is disposed on the socket base 30. In FIG. 16, the engagement holes 23 formed on the sheet-shaped base board 2 are engaged with the engaging portions 41*h*, so that it is positioned. Under such a state, as for the two light guides 21 of the sheet-shaped base board 2, the end faces of them are respectively located in vicinities of the front faces of the light-sensitive element 5*a* and the light emitting element 5*b*. After that, the sheet-shaped base board 2 is pushed down toward the contacts 6 with the cover 31 (not illustrated) from above, so that the location of it displaces downward, and the end faces of the light guides 21 will be located in front of the light-sensitive element 5*a* and the light emitting element 5*b*.

Figure 17:
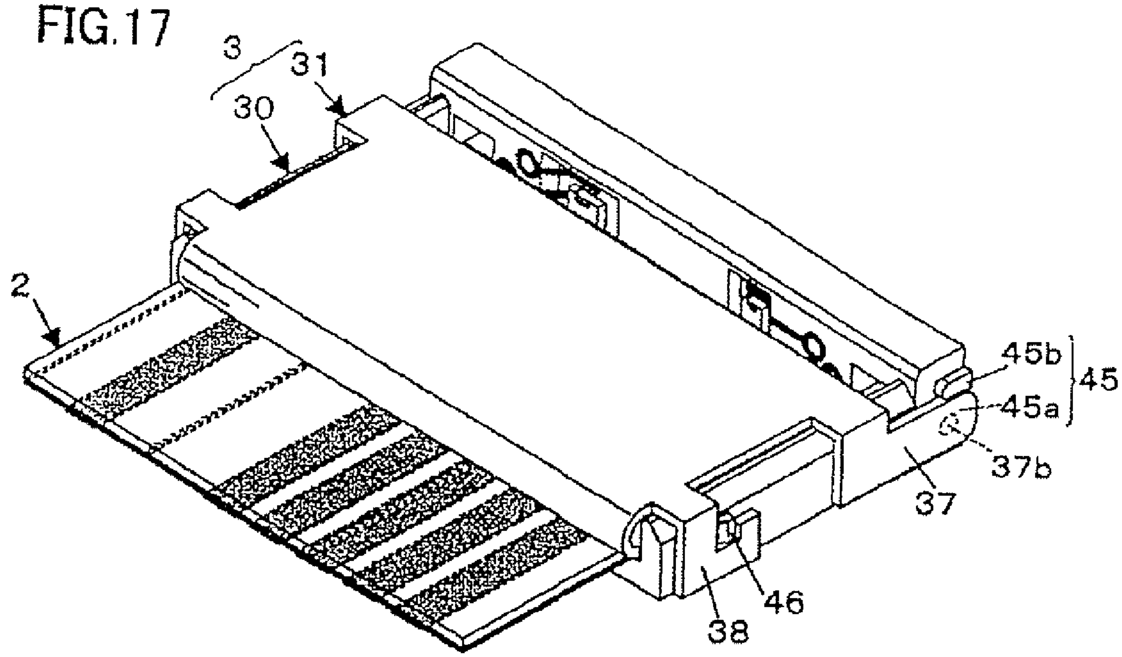
FIG. 17 is a perspective view showing a state that a cover is further attached to the sate shown in FIG. 16 and the sheet-shaped base board is connected to the socket in the optical and electrical compound connector.
Figure 18:
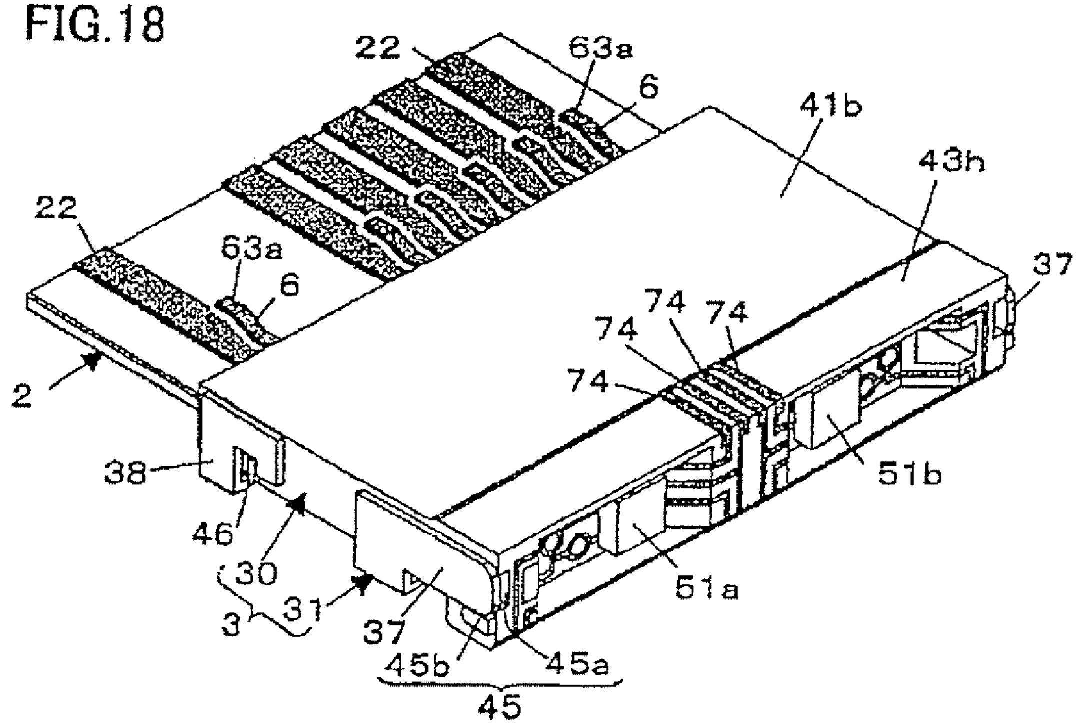
FIG. 18 is a perspective view showing the state that the sheet-shaped base board is connected to the socket in the optical and electrical compound connector which is observed from the opposite side in FIG. 17.

FIGS. 17 and 18 are views of the optical and electrical compound connector 1 in a state that the sheet-shaped base board 2 is connected to the socket base 30 and the cover 31 is attached to the socket base 30 respectively observed from upper rear side and lower front side. The rotation shaft portions 37 of the cover 31 are engaged with the shaft engagement portions 45 of the socket base 30 each comprised of the bearing groove 45*a* and the engaging protrusion 45*b*. Furthermore, the hooks 38 of the cover 31 are hooked with the hooking protrusions 46 of the socket base 30. Consequently, both of the parallel displacement and the rotation of the cover 31 are restricted, so that the cover 31 is fixed on the socket base 30. In addition, the conductor patterns 74 formed on the bottom face 43*h* and the bottom faces 63*a* of the contacts 6 serving as soldered faces are illustrated in FIG. 18. These conductor patterns 74 and the bottom faces 63*a* are constituted to be disposed on the same plane.

Figure 19A:
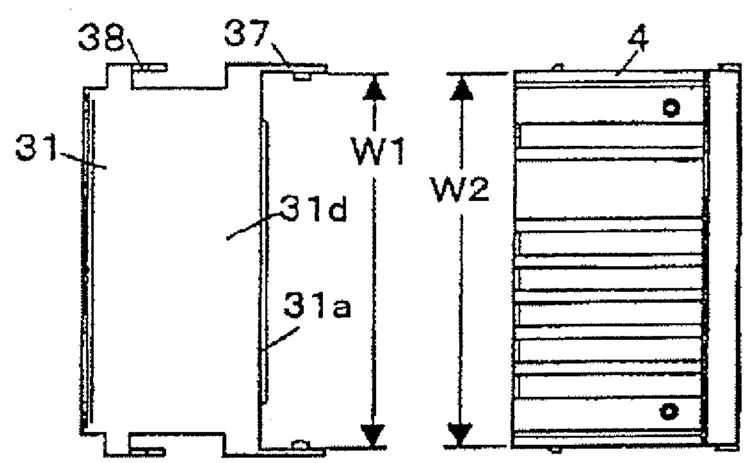
FIG. 19A is a plain view showing a constitution of the above cover.
Figure 19B:
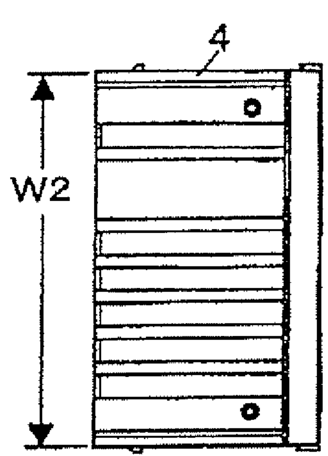
FIG. 19B is a plain view showing a constitution of the above body.
Figure 19C:
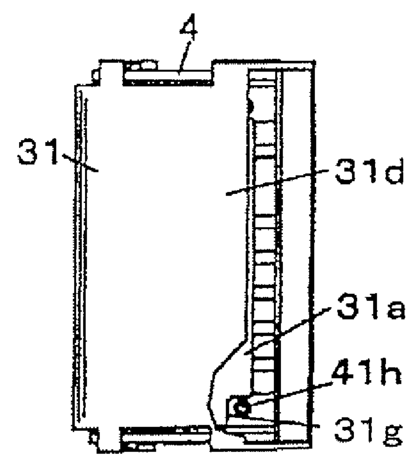
FIG. 19C is a partially broken-out plain view showing a state that the above cover is attached to the body.

FIG. 19A shows the shape of the cover 31 observed from the top face side thereof. In addition, FIG. 9B shows a view of the body 4 observed from the top face side thereof. And FIG. 19C is a view of a state that the cover 31 is engaged with the body 4 observed from the top face side. An inside measure W1 between the rotation shaft portions 37 of the cover 31 is set to be substantially the same as but a little larger than a width measure W2 of the body 4. In addition, notches 31*g* are formed at both corner portions of the end portion 31*e* of the contacting piece 31*a* of the cover 31 so that it can press the sheet-shaped base board 2 without interference of the engagement portions 41*h*.

A process to attach the cover 31 to the socket base 30 (body 4) is described. FIGS. 20A to 20D are side views showing the process to attach the cover 31 to the body 4 in step by step, and FIGS. 20E to 20H are sectional views corresponding to FIGS. 20A to 20D, respectively.

Figure 20A:
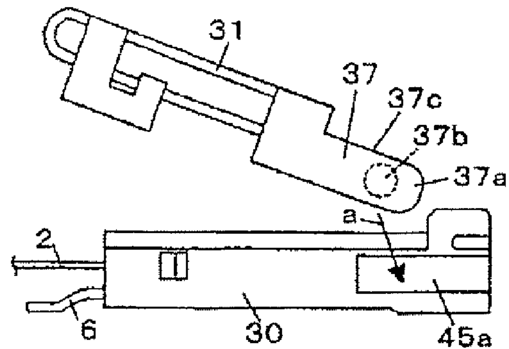
FIGS. 20A to 20D are side views showing steps to attach the above cover to the body in step by step.
Figure 20B:
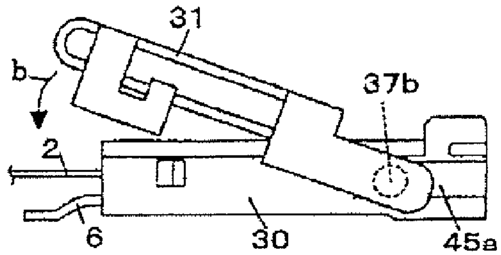
Figure 20C:
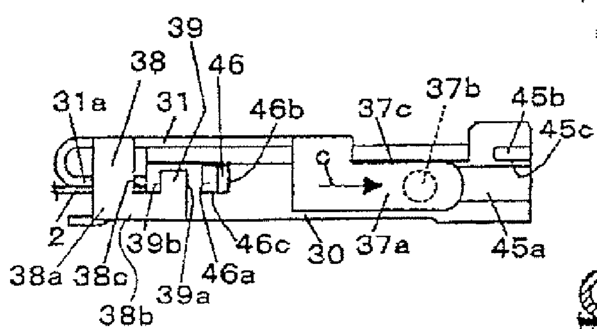
Figure 20D:
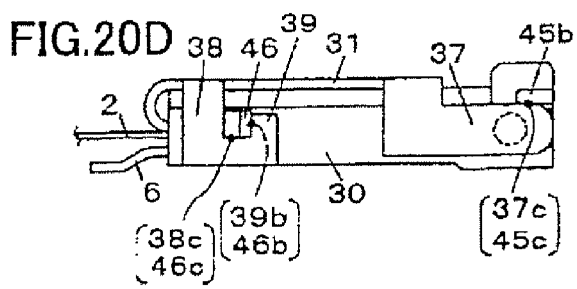
Figure 20E:
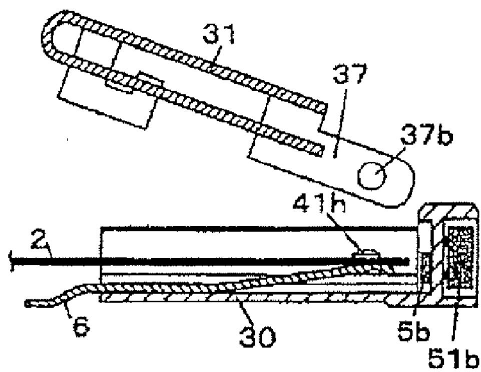
FIGS. 20E to 20H are sectional views respectively corresponding to FIGS. 20A to 20D.

Firstly, as shown in FIGS. 20A and 20E, the rotation shafts 37*b* of the rotation shaft portions 37 of the cover 31 are inserted into and engaged with the bearing grooves 45*a* of the shaft engagement portions 45 of the base 40 (SIC). At this time, one rotation shaft 73*b* (SIC) is inserted into the corresponding bearing groove 45*a* prior to the other. Then, the other rotation shaft 73*b* (SIC) is slid along the slanted face 41*k* (referring to FIG. 9 and so on) formed on upper portion of the side wall 41*g* of the body 4, so that it is inserted into the corresponding bearing groove 45*a*.

Figure 20F:
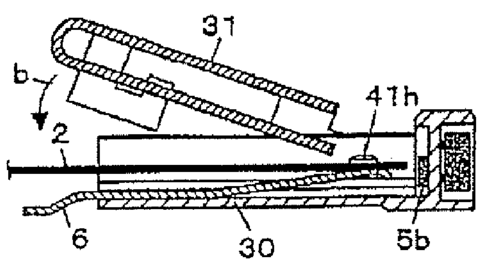

When the rotation shafts 37*b* are engaged with the bearing grooves 45*a*, the cover 31 is rotated around the rotation shafts 37*b* as indicated by arrow "a" in FIGS. 20B and 20F. At this time, the rotation shaft 37*b* in the bearing groove 45 (SIC) is preferably located at a position in rear side (in a side far from the third wall 43) of the bearing groove 45 so as to avoid the interference of the arm 37*a* of the rotation shaft portion 37 and the engaging protrusion 45*b* of the shaft engagement portions 45 and the interference of the hook 38 and the hooking protrusion 46.

Figure 20G:
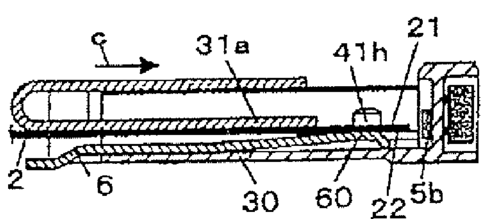

When the cover 31 is rotated in a direction indicated by arrow "b" and the outside flat plate portion 31*d* becomes in parallel with the bottom face of the body 4 as shown in FIGS. 20C and 20G, the sheet-shaped base board 2 is pushed down toward the contacts 6 with the inside flat plate portion 31*a* of the cover 31, so that the conductor patterns 22 of the sheet-shaped base board 2 becomes a state to be pressed to the protrusions 60 of the contacts 6 each other.

Figure 20H:
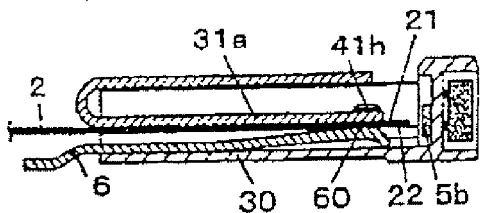

Subsequently, when the cover 31 is displaced forward in parallel toward the body 4 as indicated by arrow "c", the hooks 38 of the cover 31 are engaged with the hooking protrusions 46 of the body 4 and the arms 37*a* of the rotation shaft portions 37 are engaged with the engaging protrusions 45*b* of the shaft engagement portions 45, as shown in FIGS. 20D and 20H, so that the parallel displacement and the rotation of the body 31 against the body 4 are restricted. Consequently, the cover 31 is fixed on the body 4 (or the socket base 30).

Hereupon, relationship of engagement of each portion of the cover 31 and the socket base 30 is described. The hook 38 of the cover 31 has a longitudinal side 38*a* which is bent substantially at right angle from each side of the outside flat plate portion 31*d* toward the inside flat plate portion 31*a*, a transversal side 38*b* protruding forward (toward the rotation shaft portion 37) and parallel to the outside flat plate portion 31*d* from a free end of the longitudinal side 38*a*, and a hooking portion 39 protruding upward (toward the outside flat plate portion 31*d*) from a free end of the transversal side 38*b*. As shown in FIG. 20D, a rear edge 39*b* of the hooking portion 39 engages with a front wall face 46*b* of the hooking protrusion 46, and an upper edge 38*c* of the transversal side 38*b* engages with a bottom face 46*c* of the hooking protrusion 46. In addition, an upper edge 37*c* of the arm 37*a* of the rotation shaft portion 37 of the cover 31 engages with a bottom face 45*c* of the engaging protrusion 45*b* of the shaft engagement portion 45 of the body 4.

When forward parallel displacement of the cover 31 indicated by arrow "c", a front edge 39*a* and the rear edge 39*b* of the hooking portion 39 of the hook 38 sequentially climb over a slanted face 46*a* of the hooking protrusion 46, so that the hook 38 of the cover 31 engages with the hooking protrusion 46 of the body 4, and simultaneously, the arm 37*a* of the rotation shaft portion 37 engages with the engaging protrusion 455*b* of the shaft engagement portion 45. Thereby, the connection work of the sheet-shaped base board 2 to the socket 3 is completed. Under such a state, the engagement structure of the rear edge 39*b* of the hooking portion 39 with the front wall face 46*b* of the hooking protrusion 46 serves as a retainer of the cover 31. Furthermore, the engagement structure of the upper edge 38*c* of the transversal side 38*b* and the bottom face 46*c* of the hooking protrusion 46 serves as a stopper for rotation of the cover 31. Still furthermore, the engagement structure of the upper edge 37*c* of the arm 37*a* of the rotation shaft portion 37 with the bottom face 45*c* of the engaging protrusion 45*b* ensures the fixation of the rotation shaft portion 37 of the cover 31.

According to such a constitution to fix the cover 31 on the body 4 with displacing the cover 31 in the insertion direction of the sheet-shaped base board 2 after the rotation, a predetermined length of a hooking piece, with which a necessary elastic deformation can be obtained when the hooking portion 39 of the hook 30 (SIC) climbs over the slanted face 46*a* of the hooking protrusion 46, can be secured in the insertion direction of the sheet-shaped base board 2 instead of the thickness direction of the socket base 30. Consequently, the socket 3, and thereby, the optical and electrical compound connector 1 can be made thinner than the case that the cover 31 is hooked on the body 4 with the rotation only.

SEVENTH EMBODIMENT

Subsequently, an optical and electrical compound connector 1 in accordance with a seventh embodiment of the present invention is described. Although the optical and electrical compound connector 1 in accordance with the above sixth embodiment comprises both of the light-sensitive element 5*a* and the light emitting element 5*b*, the optical and electrical compound connector 1 in accordance with the seventh embodiment, however, comprises only one of a light-sensitive element 5*a* or a light emitting element 5*b*. Besides, the portions in common with those in the optical and electrical compound connector 1 in accordance with the above sixth embodiment are indicated with the same reference symbols, and the explanations of them are omitted.

Figure 21C:
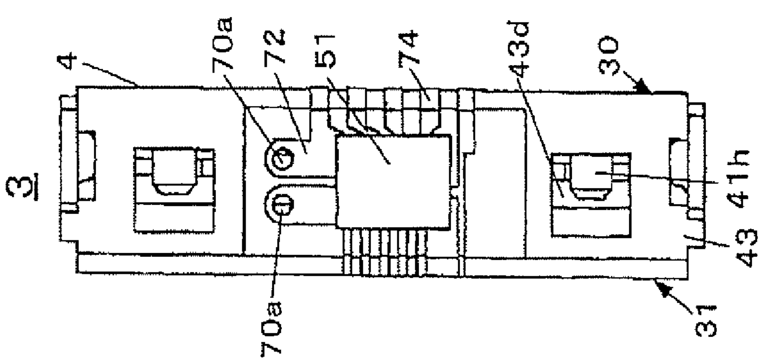
FIGS. 21A to 21C are respectively a front view, a plain view and a rear view showing a constitution of a socket of an optical and electrical compound connector in accordance with a seventh embodiment of the present invention.
Figure 21B:
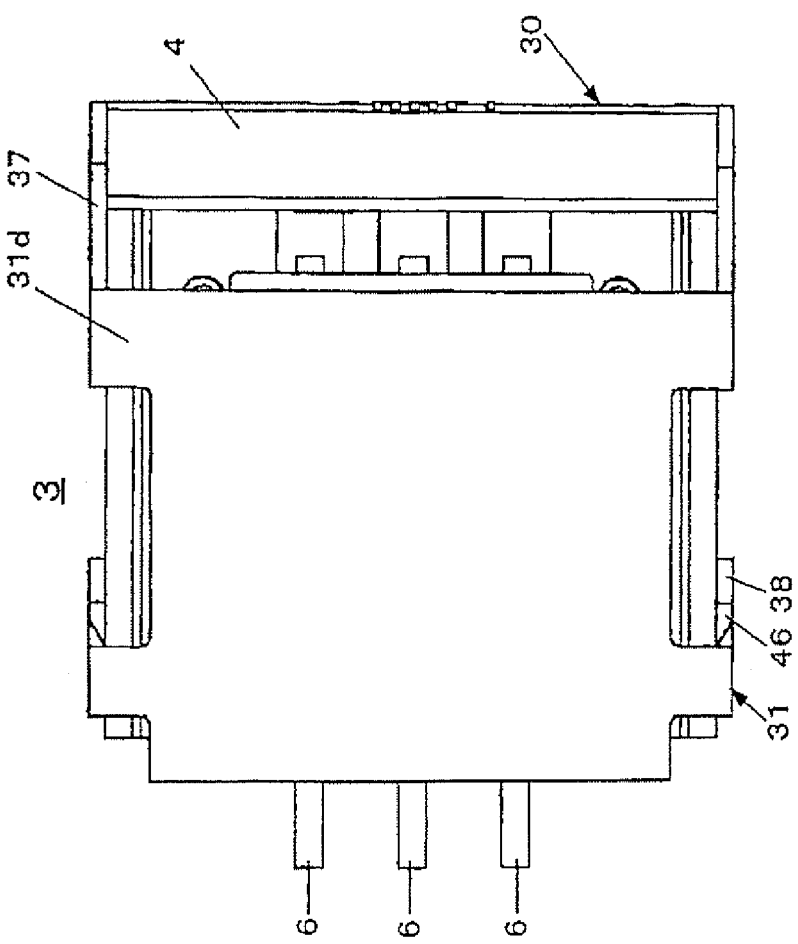
Figure 21A:
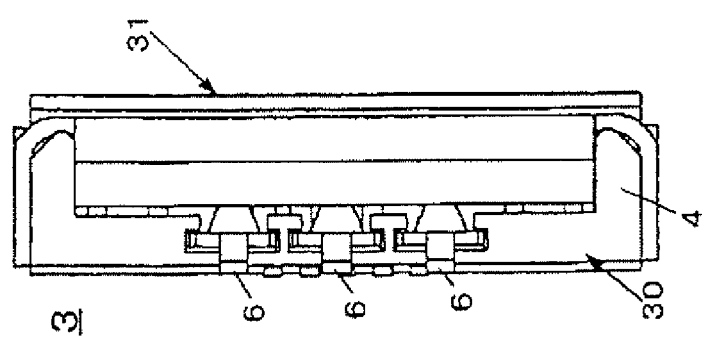
Figure 22:
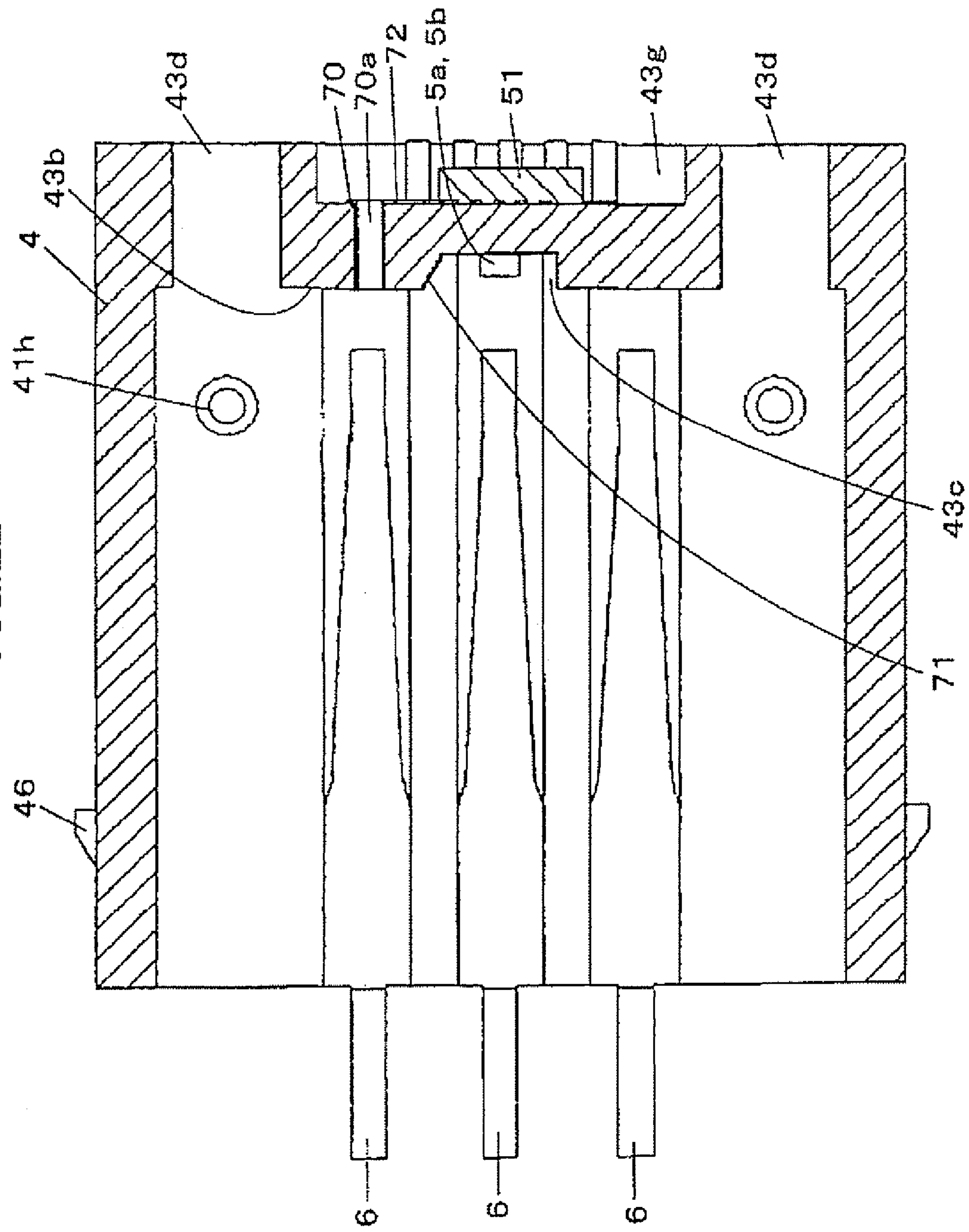
FIG. 22 is a sectional plain view showing a constitution of a socket base in the seventh embodiment mentioned above.
Figures 23A, 23B, 23C, 23D:
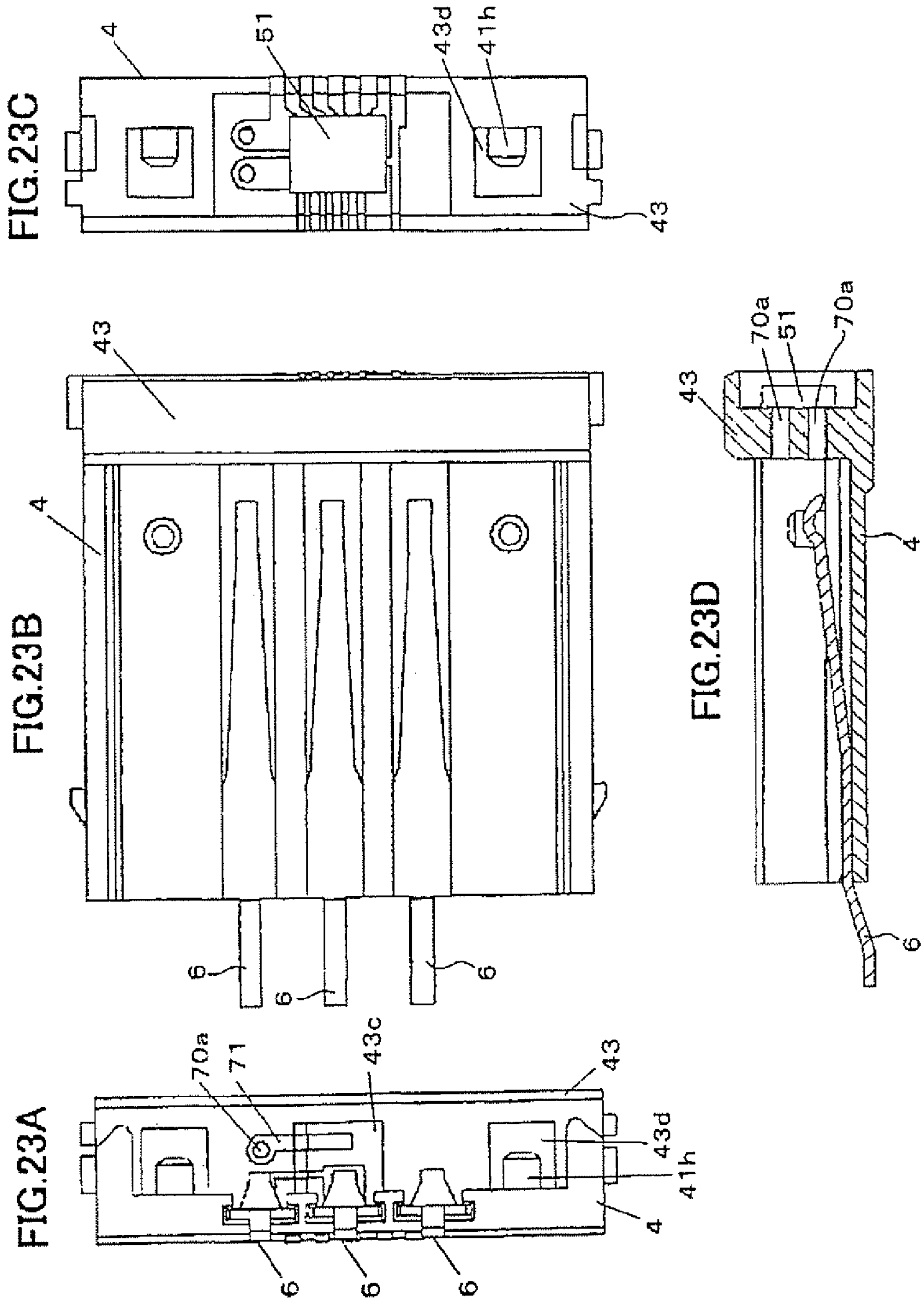
FIGS. 23A to 23D are respectively a front view, a plain view, a rear view and a side sectional view showing a constitution of the above socket base.
Figure 24:
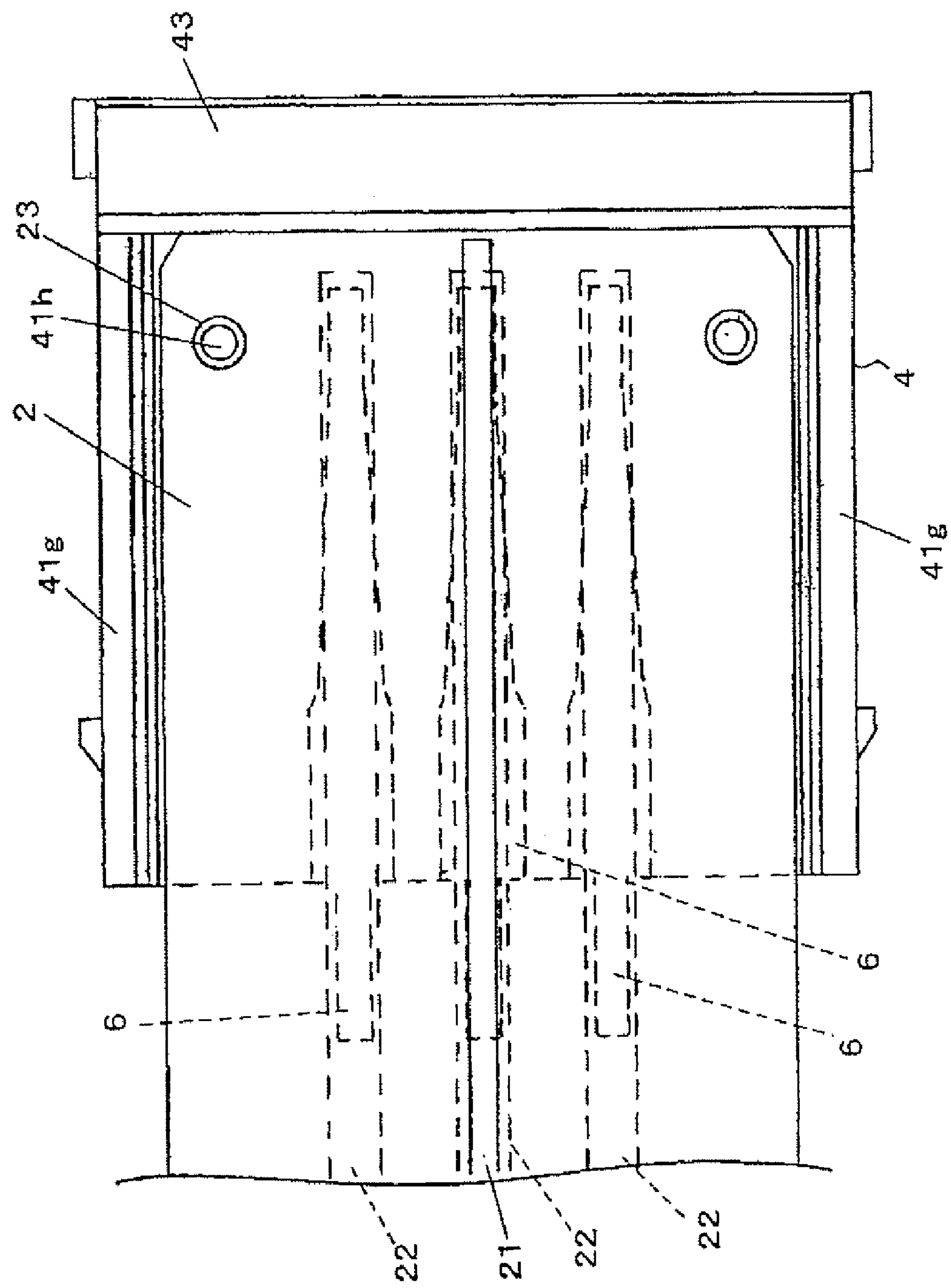
FIG. 24 is a plan view showing a state that the sheet-shaped base board is attached to the above socket base.

FIGS. 21A to 21C are a front view, a plain view and a rear view respectively showing a constitution of a socket 3 of the optical and electrical compound connector in accordance with the seventh embodiment. FIG. 22 is a sectional plain view showing a constitution of a socket base 30 which is one excluded a cover 31 from the socket 3. FIGS. 23A to 23D are a front view, a plain view, a rear view and a sectional side view respectively showing the constitution of the socket base 30. FIG. 24 is a plain view showing a state that a sheet-shaped base board 2 is attached to the socket base 30.

As can be seen from these figures, a single concavity 43*g*, into which an integrated circuit chip 51 is implemented, is formed at a center portion of a rear face 43*e* of a third wall 43 of a body 4, and a single concavity 43*c* into which the light-sensitive element 51 or the light emitting element 5*b* is formed at a center portion of a front face 43*b*. In addition, via holes 70*a* are formed to penetrate through the third wall 43 from the front face 43*b* of the third wall 43 to the concavity 43*g* avoiding the concavity 43*c*.

In the seventh embodiment, since only one of the light-sensitive element 5*a* or the light emitting element 5*b* is implemented on the socket base 30, only reception or transmission is possible with respect to light signals. On the other hand, with respect to electric signals, it may be transmitted and received as well as transmission or reception. The sheet-shaped base board 2 exemplified in FIG. 24 has one light guide 21 disposed at substantially the center and three conductor patterns so that it can transmit the light signals of a single system and the electric signals of for example three systems, simultaneously.

Besides, the present invention is not limited to the constitutions of the above mentioned embodiments, and various kinds of deformation are possible. For example, the shape of the sheet-shaped base board 2 is not limited to one shown in FIGS. 7A and 7B, so that it may be formed as forked shape like a normal FPC or an optional shape. Furthermore, the present invention can be applied to an optional number of connection systems. Still furthermore, the conductor patterns 22 are not limited to be formed on one face of the sheet-shaped base board 2, and it may be formed on both faces. Still furthermore, it is needless to say that numbers of the light-sensitive element 5*a* and/or the light emitting element 5*b*, numbers of the light guides 21 and the conductor patterns 22 of the sheet-shaped base board 2 can be selected optionally.

This application is based on Japanese patent application 2004-372251 filed in Japan, and consequently, the contents of which are hereby incorporated by references of the specification and drawings of the above patent application.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. An optical and electrical compound connector for at least one of receiving and transmitting light signals and at least one of receiving and transmitting electric signals simultaneously, the connector comprising:

a flexible sheet-shaped base board having at least one light guide provided therein along an insertion direction of the sheet-shaped base board and conductor patterns provided on a surface of the sheet-shaped base board, the conductor patterns being provided between a front end and a rear end of the sheet-shaped base board in the insertion direction, the sheet-shaped base board being configured to transmit the light signals and the electric signals simultaneously;

a connector main body connected to the sheet-shaped base board;

a light-sensitive element configured to receive the light signals from at least one of the light guide of the sheet-shaped base board and a light emitting element configured to transmit light signals to the light guide of the sheet-shaped base board;

contacts performing transmission and reception of the electric signals with respect to the conductor patterns of the sheet-shaped base board;

the connector main body having a first wall and a second wall which encloses the sheet-shaped base board from both sides in a thickness direction of the connector main body, and the connector main body having a third wall facing the front end of the sheet-shaped base board in the insertion direction;

at least one of the light-sensitive element and the light emitting element are disposed on one of the first, second and the third walls;

the connector main body comprising a body portion having the first wall and the third wall, and a cover connected to the body portion, the cover providing the second wall and being configured to rotate between an opened state and a closed state;

each of the contacts having a protrusion formed at a part thereof electrically connected to the conductor patterns of the sheet-shaped base board by an electric connection, the contacts being disposed on the first wall; and a measure of a clearance between the protrusion and the second wall, when the cover is closed without connecting the sheet-shaped base boards, is smaller than a measure of a thickness of the sheet-shaped base board.

2. The optical and electrical compound connector in accordance with claim 1, wherein when the cover is closed to provide the second wall, the cover comprises:

a contacting piece which contacts the sheet-shaped base board and presses the sheet-shaped base board to the contacts disposed on the first wall;

a curvature portion configured to bend an extended portion of the contacting piece outward at a position opposite to a side where the third wall is located;

a main cover portion formed by extending the curvature portion to a vicinity of the third wall substantially parallel to the contacting piece; and rotation shaft portions which are formed to protrude toward the third wall from an end portion of the main cover portion in the side of the third wall, and rotatably provided on the body.

3. The optical and electrical compound connector in accordance with claim 1, wherein the body portion comprises a hooking protrusion configured to hook the cover when the cover is closed on a side face of the first wall;

the cover is attached to the body rotatably between the opened state and the closed state and movable parallel to the first wall when the cover is closed; and when the cover is displaced parallel to the first wall in the closed state, the cover comprises a hook shaped portion configured to prevent rotation and parallel displacement of the cover, the hook shaped portion extending over the hooking protrusion of the body so as to be connected to the hooking protrusion.

4. The optical and electrical compound connector in accordance with claim 1, the first wall comprises an engaging portion which is engaged with the sheet-shaped base board so as to position the first wall relative to the sheet-shaped base board.

* * * * *